US009020488B2

(12) United States Patent
Axell et al.

(10) Patent No.: US 9,020,488 B2
(45) Date of Patent: Apr. 28, 2015

(54) PRIORITIZATION OF WIRELESS TERMINAL MEASUREMENTS

(75) Inventors: Christian Axell, Mjölby (SE); Håkan Asp, Nykil (SE); Henrik André-Jönsson, Linköping (SE); Kenneth Balck, Linköping (SE); Rasmus Axén, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 191 days.

(21) Appl. No.: 13/204,067

(22) Filed: Aug. 5, 2011

(65) Prior Publication Data

US 2013/0035085 A1 Feb. 7, 2013

(51) Int. Cl.
| | |
|---|---|
| *H04M 3/00* | (2006.01) |
| *H04W 24/10* | (2009.01) |
| *H04W 36/00* | (2009.01) |
| *H04W 72/00* | (2009.01) |
| *H04W 4/00* | (2009.01) |
| *H04B 7/212* | (2006.01) |

(52) U.S. Cl.
CPC ........................................... *H04W 24/10* (2013.01)

(58) Field of Classification Search
USPC .......................................................... 455/419
See application file for complete search history.

(56) References Cited

U.S. PATENT DOCUMENTS

| | | | | |
|---|---|---|---|---|
| 2005/0277416 A1* | 12/2005 | Tolli et al. | ..................... | 455/436 |
| 2008/0176565 A1* | 7/2008 | Eerolainen et al. | ........... | 455/436 |
| 2009/0325501 A1* | 12/2009 | Somasundaram et al. | . | 455/67.11 |
| 2010/0041412 A1* | 2/2010 | Yu | ................................... | 455/450 |
| 2010/0136920 A1* | 6/2010 | Shrivastava et al. | ....... | 455/67.11 |
| 2010/0142498 A1* | 6/2010 | Hyounhee | ..................... | 370/337 |
| 2011/0034165 A1* | 2/2011 | Hsu | ................................ | 455/423 |
| 2011/0188396 A1* | 8/2011 | Jung et al. | ..................... | 370/252 |
| 2012/0195290 A1* | 8/2012 | Bienas et al. | ................. | 370/332 |
| 2012/0207102 A1* | 8/2012 | Martin et al. | ................. | 370/329 |
| 2012/0300657 A1* | 11/2012 | Jung et al. | ..................... | 370/252 |

(Continued)

FOREIGN PATENT DOCUMENTS

| | | |
|---|---|---|
| WO | 01/22759 A1 | 3/2001 |
| WO | 03/098952 A1 | 11/2003 |
| WO | WO2009/131870 A1 * | 4/2009 |

(Continued)

OTHER PUBLICATIONS

3GPP TS 36.331 V9.4.0, 3rd Generation Partnership Project; Technical Specification Group Radio Access Network; Evolved Universal Terrestrial Radio Access (E-UTRA); Radio Resource Control (RRC); Protocol specification (Release 9), Sep. 2010, Valbonne, France (252 pages).

(Continued)

*Primary Examiner* — Timothy Pham

(57) ABSTRACT

A base station generates and sends measurement configuration to a wireless terminal. The measurement configuration indicates the measurements to be made by the wireless terminals and to report on the performed measurements to the base station. The measurement configuration indicates that the measurements are to be performed and to be reported based on a prioritization level. The prioritization can be indicated at various levels including the measurement identities level, the measurement objects level, and the reporting configurations level.

38 Claims, 14 Drawing Sheets

(56) References Cited

U.S. PATENT DOCUMENTS

2012/0307669 A1* 12/2012 Kim et al. ............ 370/252
2012/0314589 A1* 12/2012 Chen et al. ............ 370/252

FOREIGN PATENT DOCUMENTS

| WO | 2010/140797 | A2 | 12/2010 |
| WO | 2011/142715 | A1 | 11/2011 |
| WO | 2013/021297 | A1 | 2/2013 |

OTHER PUBLICATIONS

International Preliminary Reporting on Patentability dated Feb. 11, 2014 in International Application No. PCT/IB2012/053618 (7 pages).
International Search Report and Written Opinion dated Nov. 6, 2012 in International Application No. PCT/IB2012/053618 (13 pages).
3GPP TS 36.331 V10.2.0; 3rd Generation Partnership Project; Technical Specification Group Radio Access Network; Evolved Universal Terrestrial Radio Access (E-UTRA); Radio Resource Control (RRC); Protocol specification (Release 10), 294 pages.

* cited by examiner

PRIORITIZATION OF WIRELESS TERMINAL MEASUREMENTS

TECHNICAL FIELD

Technical field of present disclosure generally relates to making and reporting measurements at and reporting measurement from wireless terminals, and in particular to prioritizing measurements made at and reported from the wireless terminals.

BACKGROUND

According to 3GPP TS 36.331, which is herein incorporated by reference in its entirety, there are two main types of measurements made by the UE (user equipment) in E-UTRAN (Evolved Universal Terrestrial Radio Access Network)—periodic and event-based. All measurements are configured by the eNodeB, but are performed by the UE. The measurements are sent in one or several RRCConnectionReconfiguration messages.

Periodic measurements are configured per frequency layer and imply that the UE sends periodical measurement reports. A frequency layer is a frequency or a group of frequencies of a specific RAT (radio access technology). Event-based measurements use the same UE measurements as the periodic measurements, but the UE will only report when an event criterion is fulfilled. The event criterion can for example be of type "Serving becomes better than absolute threshold".

The eNodeB can order several measurements on same or different frequency layers. The measurements can be ordered on a need basis, i.e., not all measurements need be ordered in one RRCConnectionReconfiguration message. The UE-EUTRA-Capability IE (Information Element) indicates which frequency bands and RATs the UEs are capable of measuring.

A UE measurement typically consists of a MeasurementObject IE and a ReportConfig IE connected together by a MeasID IE. The MeasurementObject IE represents a frequency layer, i.e., a frequency or a frequency group of a specific RAT. The ReportConfig IE indicates the type of measurement, periodic or event-based, the quantity to measure on, etc.

The UE measurements can be used for different purposes, such as for mobility, SON (self organizing network), PM (performance management) and positioning. Operators may have one or more legacy RANs (radio access networks) where some may be of higher priority than others. For example, it is expected that the operator prefers to have the UEs connected to the RAN that provides highest throughput. For UEs that only have one receiver, measurements on different frequency layers must be performed in sequence.

Currently, the eNodeB has no control in which order the UE will perform the different measurements that are configured in the UE. If there are ongoing measurements in the UE and the eNodeB initiates new measurements, the eNodeB cannot control whether the new measurements shall interrupt the ongoing measurements or not.

SUMMARY

A non-limiting aspect of the disclosed subject matter is directed to a method performed at or on behalf of a node of a wireless network. The method comprises generating a measurement configuration for a wireless terminal of the wireless network, and sending the measurement configuration to the wireless terminal. The measurement configuration comprises a measurement configuration prioritization that indicates a prioritization of measurements to be performed by the wireless terminal for reporting to the node. The measurements to be performed are measurements of one or more wireless signals transmitted from one or more cells in one or more radio access technologies.

Another non-limiting aspect of the disclosed subject matter is directed to a non-transitory computer readable medium storing therein programming instructions executable by a computing unit of a node of a wireless network to perform the above described method performed at the node.

Another non-limiting aspect of the disclosed subject matter is directed to a method performed at or on behalf of a wireless terminal of a wireless network. The method comprises receiving a measurement configuration from a node of the wireless network. The measurement configuration comprises a measurement configuration prioritization that indicates a prioritization of measurements to be performed by the wireless terminal for reporting to the node. The method also comprises performing measurements of one or more wireless signals transmitted from one or more cells in one or more radio access technologies in accordance with the measurement configuration and in a priority order in accordance with the measurement configuration prioritization. The method further comprises reporting the measurements to the node in accordance with the measurement configuration.

Another non-limiting aspect of the disclosed subject matter is directed to a non-transitory computer readable medium storing therein programming instructions executable by a computing unit of a wireless terminal of a wireless network to perform the above described method performed at the wireless terminal.

Another non-limiting aspect of the disclosed subject matter is directed to a node of a wireless network which comprises a measurement configuration unit and a communication unit. The measurement configuration unit is configured to generate a measurement configuration for a wireless terminal of the wireless network, and the communication unit structured to send the measurement configuration to the wireless terminal. The measurement configuration comprises a measurement configuration prioritization which indicates a prioritization of measurements to be performed by the wireless terminal for reporting to the node. The measurements to be performed are measurements of one or more wireless signals transmitted from one or more cells in one or more radio access technologies.

Another non-limiting aspect of the disclosed subject matter is directed to a wireless terminal of a wireless network which comprises a communication unit and a measurement unit. The communication unit is structured to receive a measurement configuration from a node of the wireless network. The measurement configuration comprises a measurement configuration prioritization indicating a prioritization of measurements to be performed by the wireless terminal for reporting to the node. The measurement unit is structured to perform measurements of one or more wireless signals transmitted from one or more cells in one or more radio access technologies in accordance with the measurement configuration and in a priority order in accordance with the measurement configuration prioritization. The communication unit is also structured to report to the node the measurements in accordance with the measurement configuration.

DESCRIPTION OF THE DRAWINGS

The foregoing and other objects, features, and advantages of the disclosed subject matter will be apparent from the following more particular description of preferred embodi

DETAILED DESCRIPTION

Figure 1:
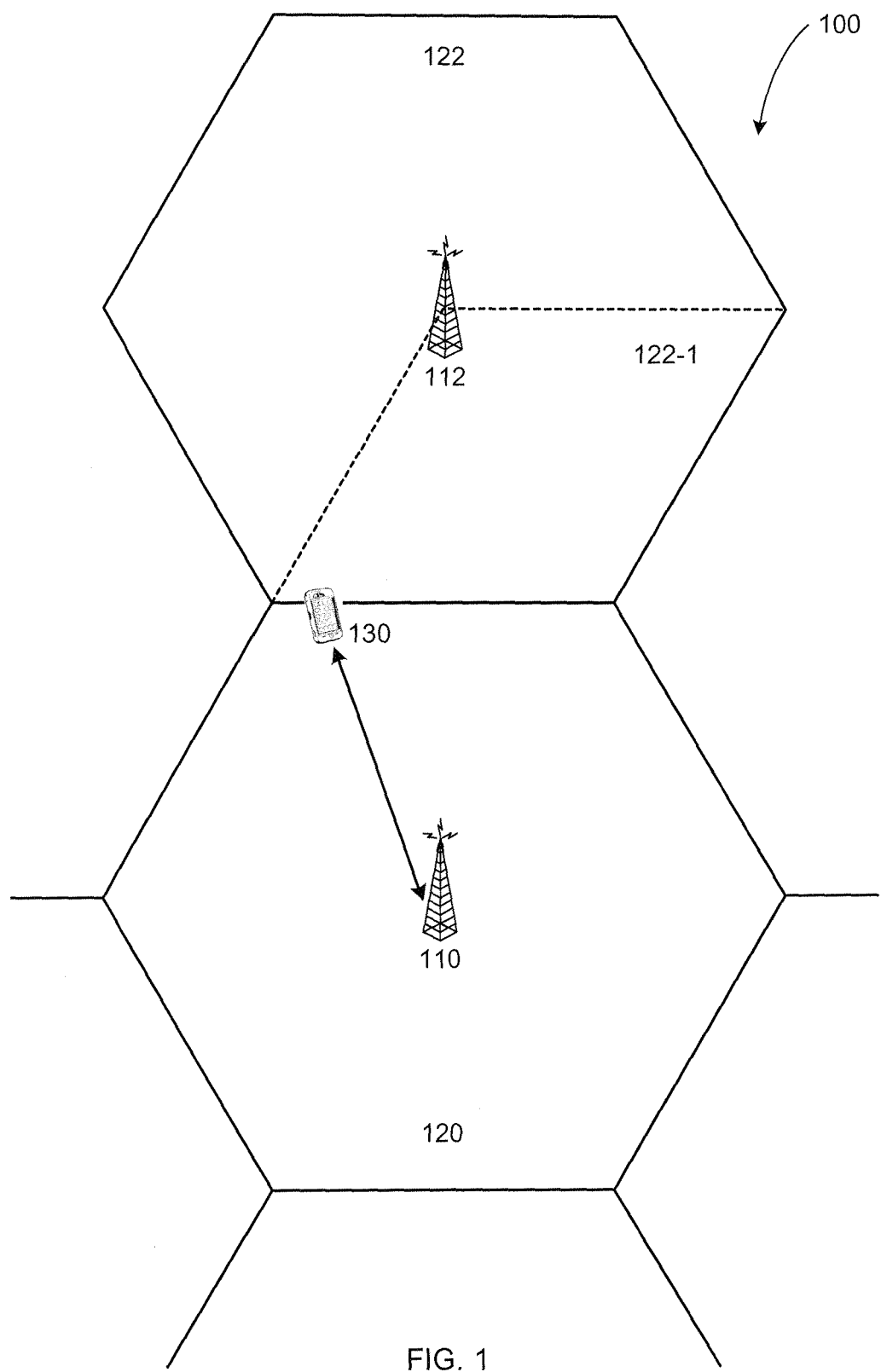
- FIG. 1 illustrates an example scenario in a wireless network in which a base station configures measurements to be performed and reported by a wireless terminal.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this disclosure, 3GPP is primarily used as examples for explanation purposes. However, the scope of this disclosure is not limited to the set of 3GPP wireless network systems and can encompass many domains of wireless network systems. Also, a base station (e.g. RBS, NodeB, eNodeB, eNB) will be used as an example of a node in which the described method can be performed to prioritize measurements. However, it should be noted that the disclosed subject matter is applicable to any node that can receive measurement reports. Also, a mobile terminal (e.g. UE) will be used as an example of a wireless terminal which can make and report measurements. However, any wireless device capable of making measurements is within the scope of this disclosure.

As mentioned above, currently there is no way for the base station such as the eNodeB to efficiently control the measurements made by the wireless terminal such as the UE. Thus, it is desirable to provide method(s), apparatus(es) and/or system(s) for prioritizing measurements made and/or reported by the UE.

The prioritization can be based on the frequency layers and on purposes of the measurements. Examples of frequency layers to be measured include intra-RAT intra-frequencies (frequencies of the serving cell in the same RAT), intra-RAT inter-frequencies (frequencies different from the frequencies of the serving cell in the same RAT), and inter-RAT frequencies (frequencies of RATs different from the serving cell). Measurements can be made for the purposes of mobility, SON, performance management, cell identification, strongest cell identification, positioning and so on.

It is generally preferred that a measurement for performance management does not delay a measurement for mobility. If the measurement for performance management delays the measurement for mobility, the delay may lead to a UE drop since the UE may not have time to send the mobility measurement report before the radio link degrades to the point it becomes unusable.

This is illustrated in FIG. 1 which shows an example scenario in a wireless network 100 in which an eNodeB 110 configures measurements to be performed and reported by a UE 130. The eNodeB 110 provides services to one or more UE 130 within its coverage area 120, i.e., the cell 120. In FIG. 1, the UE 130 is near an edge of the cell 120 that borders a cell 122 served by an eNodeB 112. Assuming that the UE 130 is moving towards the cell 122, measurements for mobility should be prioritized over other measurements so that a proper handover to the eNodeB 112 may be performed before the radio link between the eNodeB 110 and the UE 130 becomes unusable.

It is also generally preferred that a handover of the UE to a frequency layer that has a lower priority does not occur if there is a higher prioritized frequency layer available. For example, assume that the UE has sent a measurement report on an event A2 measurement that is intended to be used for detecting when the UE enters a bad coverage area. The eNodeB would then want to initiate measurements on other frequency layers to find better suited cells for the UE. There can be more than one frequency layer that is configured as possible targets but one of them is preferred from a RAN perspective. For example in one cell, there could be neighboring cells on both a WCDMA frequency and on a GSM frequency. Typically, the cell(s) on the GSM frequency covers the entire serving cell while the WCDMA cells only covers part of the serving cell. The primary fallback network is WCDMA since it can provide higher bandwidth than GSM.

FIG. 1 is used to illustrate this point as well. As the UE 130 approaches the border between cells 120 and 122, it is assumed to have reported the A2 event to the eNodeB 110 indicating that the UE 130 is entering a bad coverage area. It is assumed that the neighboring eNodeB 112 can operate in both WCDMA and GSM modes. The GSM coverage area spans the entirety of the cell 122 while the coverage area of WCDMA is limited to a sector 122-1. Within the coverage area 122-1, both WCDMA and GSM are possible target frequency layers. Assuming that the UE 130 is both WCDMA and GSM capable, it is preferred to handover the UE 130 to the WCDMA frequency layer so that the UE 130 can be served on a higher bandwidth resource. The eNodeB 110 would then prioritize the UE 130 to make measurements for WCDMA over GSM. Since WCDMA does not cover the entire serving cell, finding GSM is desirable in areas where the WCDMA coverage is limited.

However, if the eNodeB 110 initiates measurements on both the WCDMA and the GSM frequencies in one RRCConnectionReconfiguration message to the UE 130, the eNodeB 110 cannot control whether the UE 130 will start its measure on the GSM frequency or on the WCDMA frequency. In this specific instance, the eNodeB 110 would prefer that the UE 130 to start measuring the WCDMA frequency and report possible cells on that frequency before it starts measuring the GSM frequency. It is of great interest that the report comes back quickly to the eNodeB 110 since the UE 130 at the edge of the cell 120 could lose connection if the handover is not initiated quickly. If the measurement reports come in the wrong order, that is if the GSM frequency measurement report comes first, the eNodeB 110 must wait until the report containing the primary frequency arrives, and the risk of losing connection with the UE 130 increases.

A solution currently does exist to address the above-described problem. But the existing solution is also problematic. According to the existing solution, the eNodeB 110 can initiate the WCDMA measurements in a first RRCConnectionReconfiguration message, and then initiate the GSM measurements in a second RRCConnectionReconfiguration message. But to ensure that the WCDMA measurement is performed before the GSM measurement, the eNodeB 110 cannot send the second RRCConnectionReconfiguration message for GSM until it has made sure that the WCDMA measurement has been performed.

Figure 2:
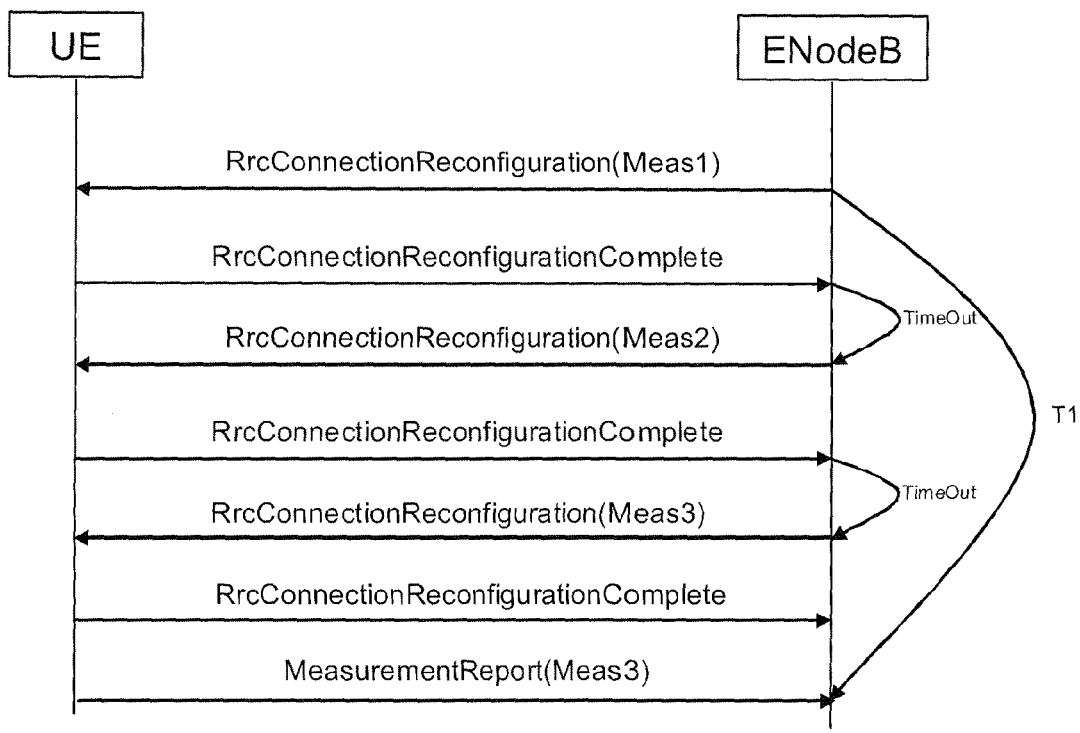
FIG. 2 illustrates flow of messages in a conventional method of configuring measurements.

This is illustrated in FIG. 2. As seen, the eNodeB 110 sends the RRCConnectionReconfiguration messages one at a time to the UE 130 in the existing method. Each RRCConnectionReconfiguration message includes a measurement configuration that indicates the measurements that the UE 130 should make and report to the eNodeB 110. To ensure that the UE 130 makes measurements in a preferred order, separate RRCConnectionReconfiguration messages must be sent in the desired order, and the subsequent message cannot be sent until the UE 130 performs the requested measurement in the previous message.

The increased time to perform multiple reports one at a time increases the risk of losing the connection with the UE 130. The risk also depends on how many other measurements that are configured in the UE 130 and in which order the UE 130 chooses to perform the existing measurements and the WCDMA measurements. In addition to the increased time, another drawback with the existing solution is that each new measurement that needs to be sent in a separate RRCConnectionReconfiguration message increases the load on the radio interface, and also increases the risk of dropping the UE 130, especially when the UE 130 is in bad coverage.

But in one or more non-limiting aspects of the present invention, a node of a wireless communication network can control prioritization order of measurements made by wireless terminals of the network. A base station (e.g. RBS, NodeB, eNodeB, eNB) is an example of such a node. Also, a UE is an example of a wireless terminal capable of making measurements and reporting back to the base station. The eNodeB is able to configure the measurements to be made by the UEs and send the configuration information in a measurement configuration message to the UE. Thus, while 3GPP terms such as the "UE" and "eNodeB" are used in this disclosure, they should not be taken to be limiting.

The prioritization can be performed at many levels including the measurement identities level, the measurement objects level, and the reporting configurations level. The prioritization can be for all measurement levels or can be applicable within each level.

In one or more aspects of the disclosed subject matter, the eNodeB 110 (or more generally a network node) generates and sends measurement configurations to the UE 130 (or more generally a wireless terminal). The measurement configuration indicates one or more measurements to be performed by the UE 130 for reporting back to the eNodeB 110. The measurements to be performed include measurements of wireless signals transmitted from cells in various RATs. The measurement configuration includes a prioritization that indicates a prioritization of measurements to be performed by the UE 130 for reporting back to the Node 110.

The measurement configuration can also include measurement objects, reporting configurations, and measurement identities. Each measurement object indicates a frequency layer to be measured by the UE 130, and each frequency layer includes one or more frequencies of a particular radio access technology, e.g. WCDMA, GSM, WiMAX, LTE, WiFi, and so on.

Each reporting configuration indicates a criterion that triggers the UE 130 to send a measurement report to the eNodeB 110. For example, the UE 130 may detect that the signal from the eNodeB 110 falls below a predetermined minimum acceptable threshold level, i.e., the UE 130 enters a bad coverage area. As another example, the UE 130 may detect that a signal from a neighboring cell is at a predetermined threshold level or greater. In yet another example, the UE 130 may detect that the signal from the neighboring cell is greater than the signal from its current serving eNodeB 110. As yet further example, a predetermined amount of time may have passed since the UE 130 sent a previous measurement report.

In 3GPP TS 36.331, specific events are defined that may trigger the reports. These include:

Event A1—Serving becomes better than absolute threshold;

Event A2—Serving becomes worse than absolute threshold;

Event A3—Neighbor becomes amount of offset better than PCell (Primary Cell);

Event A4—Neighbor becomes better than absolute threshold;

Event A5—PCell becomes worse than absolute threshold1 AND Neighbor becomes better than another absolute threshold2;

Event A6—Neighbor becomes amount of offset better than SCell (Secondary Cell);

Event B1: Neighbor becomes better than absolute threshold;

Event B2: PCell becomes worse than absolute threshold1 AND Neighbor becomes better than another absolute threshold2.

The measurement objects and the reporting configurations may be linked to each other through measurement identities. Each measurement identity links a measurement object and a reporting configuration to each other such that when the measurement performed in accordance with the linked measurement object satisfies the reporting criterion of the linked reporting configuration, the UE 130 sends the measurement report related to the performed measurement. Note that the reporting configuration can also indicate the format of the report. That is, the reporting configuration can indicate the content and/or the form of the measurement report.

As indicated above, the prioritization can be performed on many levels. For example, the prioritization can be at the measurement identities level. At this level, each and every measurement can be prioritized. The prioritization can also be applicable within the measurement objects level. At this level, all measurements on the same frequency layer will essentially have the same priority. The measurement objects level is quite natural since in most cases, all measurements on the same frequency layer collects data from the same physical environment. The reporting criterion may differ however. Prioritization at the reporting configurations level is also possible. Prioritization at this level could give the same priority to measurements on different frequency layers. For maximum control, prioritization at the measurement identities level may be preferred over prioritizations at either the measurement objects level or the reporting configurations level.

Multiple non-limiting prioritization solutions to configure and to perform measurements will be presented and described in this disclosure. It should be noted that regardless of the level on which the prioritization is performed, similar prioritization solutions may be implemented at most or all levels.

Figure 3:
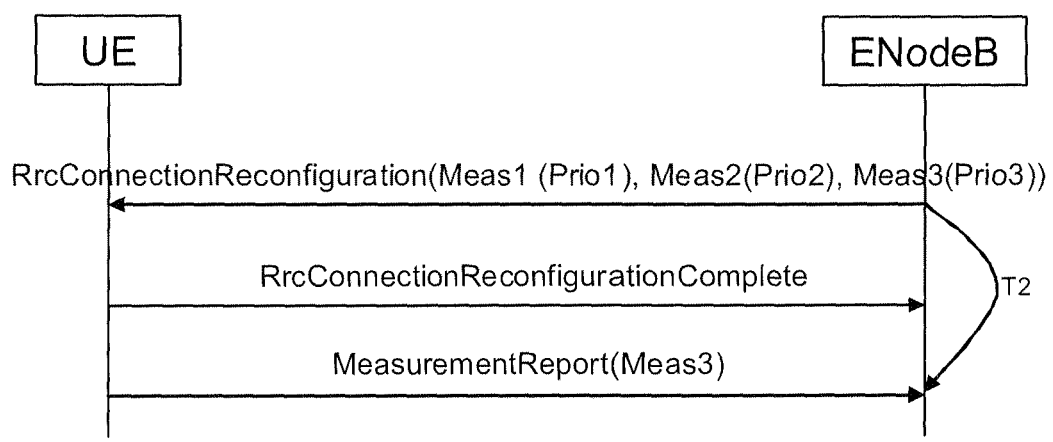
FIG. 3 illustrates flow of messages in one or more example methods of configuring measurements.

FIG. 3 illustrates an example flow of messages between the eNodeB 110 and the UE 130 when one or more example methods of configuring measurements of the disclosed subject matter are performed. Compared to FIG. 2, it is seen that the eNodeB 110 can order measurements on several frequencies/RATs in a single measurement configuration message while still being able to control the order in which the measurements are performed. In other words, the eNodeB 110 can prioritize the measurements without having to send separate configuration messages. Also compared to FIG. 2, significant amount of time is saved which reduces the risk of dropping the UE 130 due to too late measurement report. The reduced number of measurement configuration messages also reduces the risk of dropping the UE 130.

Figure 4:
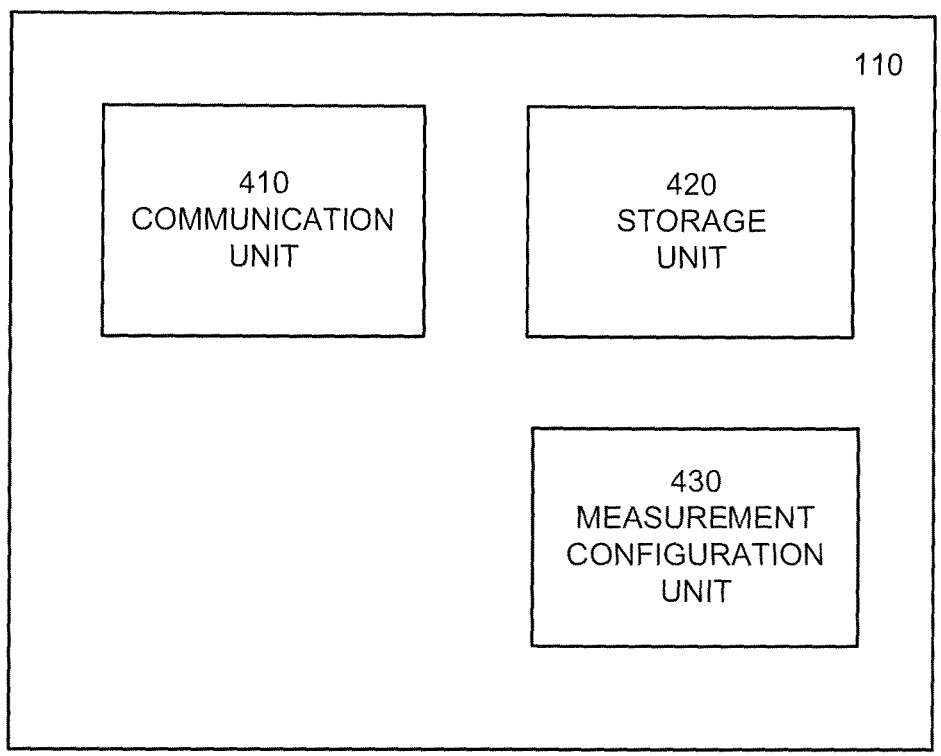
FIG. 4 illustrates an example embodiment of a node structured to configure measurements.

FIG. 4 illustrates an example embodiment of a node 110, e.g., eNodeB, which is structured to configure measurements. As seen, the node 110 includes a communication unit 410, a storage unit 420, and a measurement configuration unit 430. The measurement configuration unit 430 is structured to generate a measurement configuration for the UE 130. The communication unit 410 is structured to send the measurement configuration to UE 130. The storage unit 420 is structured to store therein information necessary for the operation of the node 110. For example, measurement configurations for different UEs may be stored. Also, the storage unit 420 may store programming instructions for the operation of the node 110. Further details of these units will be provided in conjunction with the descriptions of one or more methods of configuring measurements.

Note that FIG. 4 is a logical representation of the node 110. Thus, each of the communication unit 410, the storage unit 420, and the measurement configuration unit 430 need not be physically separate from each of the other units. It is fully contemplated that any combination of the units may be integrated into a single physical device. Further, each of the units may be implemented in multiple physical components operatively structured and coupled to each other to perform the respective function of the unit. Yet further, to the extent that some of the units share common features, multiple units may share common components.

While not explicitly shown, it is also contemplated that the node 110 as a whole can be implemented as a combination of hardware and software components. For example, the node 110 may include one or more processors, which as described above can themselves be combinations of hardware and software arranged to perform the functions associated with the units. The processors may execute programming instructions stored in a non-transitory computer readable medium, such as the storage unit 420, to perform the functions. The programming instructions may also be received in a transitory manner and stored in the non-transitory computer readable medium accessible to the node 110. For example, updates may be stored and received.

Figure 5:
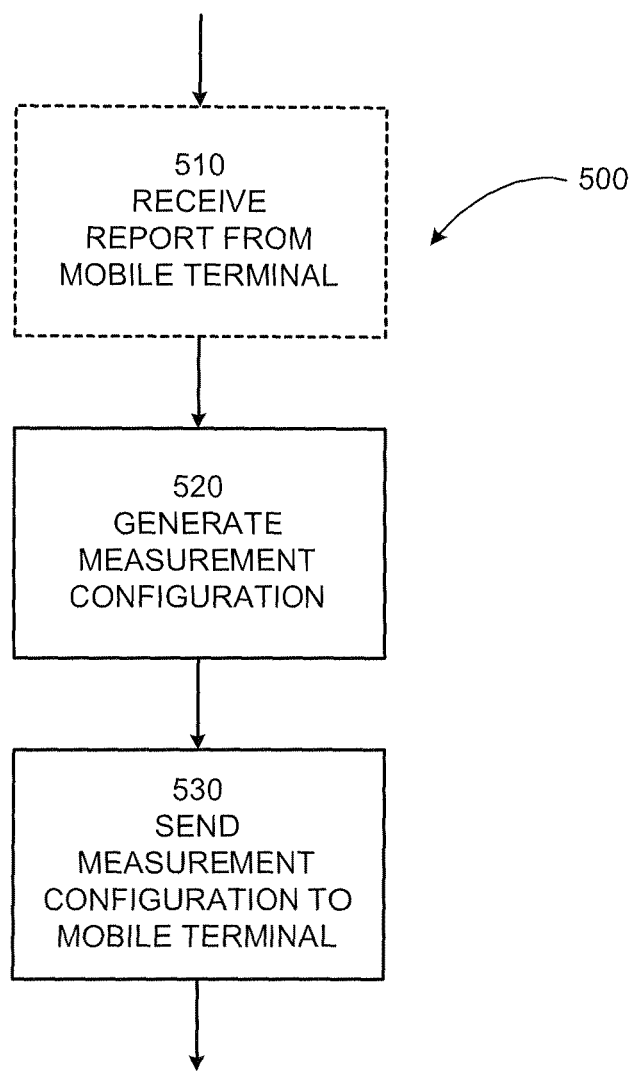
FIG. 5 illustrates an example method performed at or on behalf of a node of a wireless network to configure measurements.

FIG. 5 illustrates an example method 500 for configuring measurements. The method 500 may be performed at or on behalf of the eNodeB 110. In step 520, the measurement configuration unit 430 generates a measurement configuration for the UE 130. Then in step 530, the communication unit 410 sends the measurement configuration to the UE 130. The measurement configuration can include a measurement configuration prioritization indicating a prioritization of measurements to be performed by the UE 130 for reporting back to the eNodeB 110. The measurements to be performed by the UE 130 include measurements of one or more wireless signals transmitted from one or more cells in one or more radio access technologies.

Note that the step 520 of generating the measurement configuration for the UE 130 can be triggered when the communication unit 410 receives a report from the UE 130 in step 510. For example, the communication unit 410 may receive a report that the UE 130 is entering a bad coverage area. Upon receipt of this report, the measurement configuration unit 430 may generate measurement configuration that prioritizes measurements for mobility to be performed by the UE 130 so that the handover can be quickly initiated. Step 510 is illustrated as a dashed box to indicate that step 520 need not always follow step 510.

Figure 6:
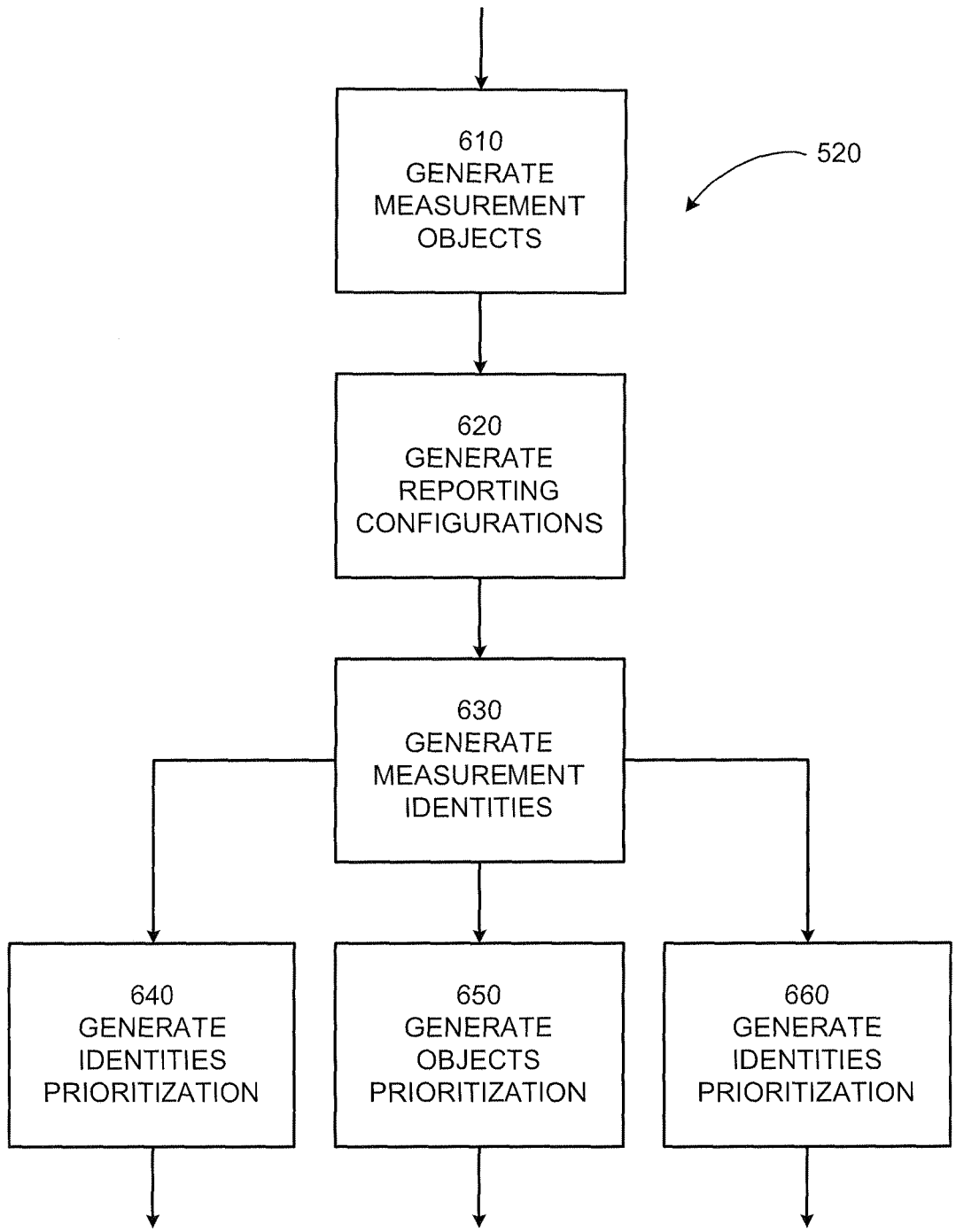
FIG. 6 illustrates an example process to generate a measurement configuration.

FIG. 6 illustrates an example process to implement step 520 of generating the measurement configuration. In step 610, the measurement configuration unit 430 generates one or more measurement objects. Each measurement object can indicate a frequency layer to be measured by the UE 130. Each frequency layer includes one or more frequencies of a particular radio access technology.

In step 620, the measurement configuration unit 430 generates one or more reporting configurations. Each reporting configuration includes criterion that triggers the UE 130 to send a measurement report to the eNodeB 110. The reporting configuration can also indicate the format of the measurement report.

Then in step 630, the measurement configuration unit 430 generates one or more measurement identities. Each measurement identity links a measurement object and a reporting configuration to each other such that when the criterion of the linked reporting configuration is satisfied, the UE 130 sends the measurement report related to the linked measurement object.

Figure 12:
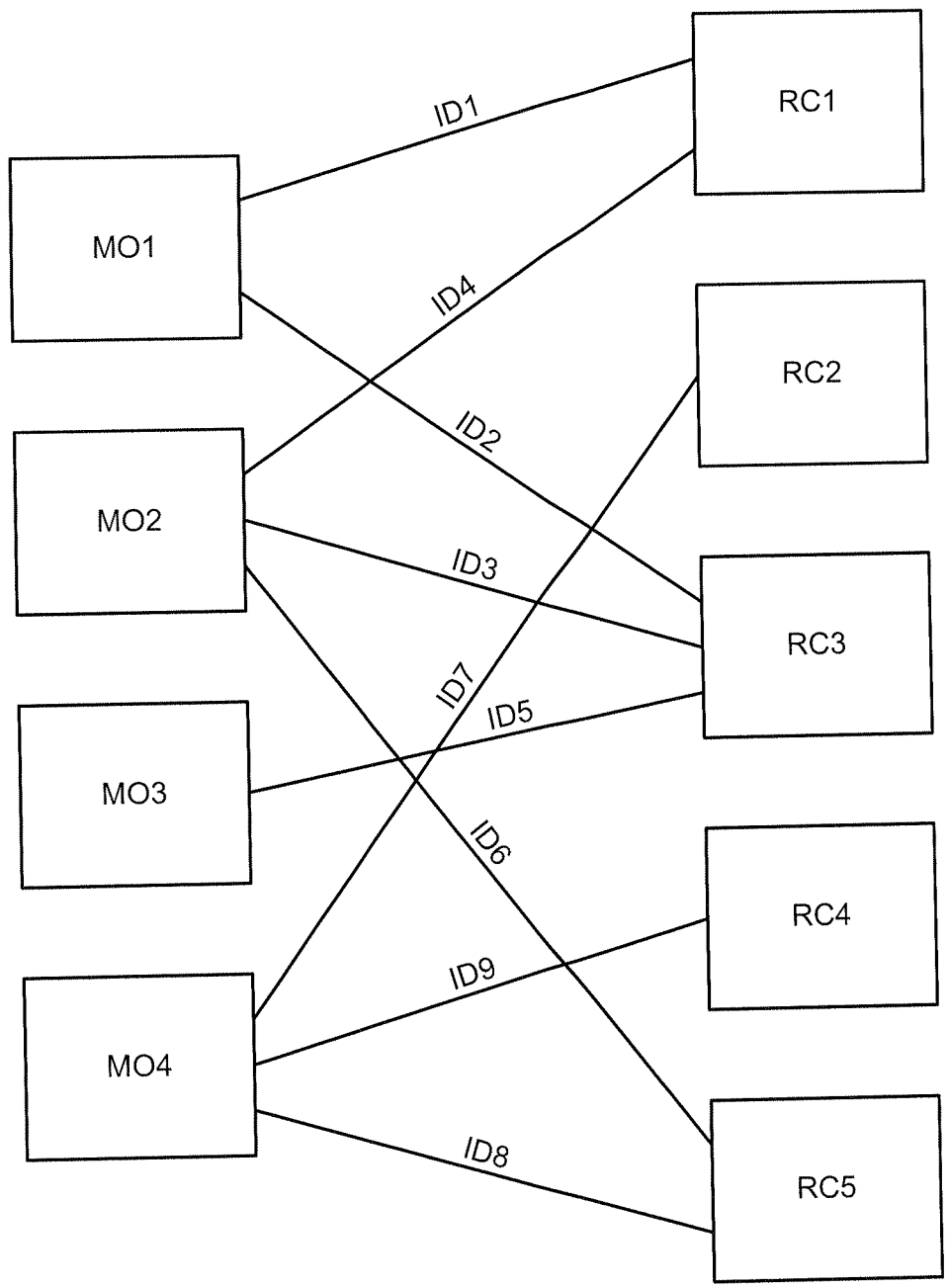
FIG. 12 illustrates an example scenario in which measurement objects and reporting configurations are linked to each other through measurement identities.

Note that each measurement object can be linked to one or more reporting configurations. Also, each reporting configuration can be linked to one or more measurement objects. That is, there can be many-to-many mappings between the measurement objects and the reporting configurations. This is shown in FIG. 12 which illustrates an example of four measurement objects MO1-MO4 linked to five reporting configurations RC1-RC5. There are nine measurement identities ID1-ID9 linking the measurement objects MO1-MO4 and the reporting configurations RC1-RC5. Table 1 below is an equivalent representation of FIG. 12.

TABLE 1

|     | RC1 | RC2 | RC3 | RC4 | RC5 |
| --- | --- | --- | --- | --- | --- |
| MO1 | ID1 |     | ID2 |     |     |
| MO2 | ID4 |     | ID3 |     | ID6 |
| MO3 |     |     | ID5 |     |     |
| MO4 |     | ID7 |     | ID9 | ID8 |

Table 1 and FIG. 12 indicate that measurement objects MO1, MO2 and MO4 are each linked to multiple reporting configurations. For example, MO1 is linked to RC1 through measurement identity ID1 and linked to RC3 through measurement identity ID2. As an illustration, it can be normal to have several reporting configurations on a serving frequency. The reporting configurations can include bad coverage (serving becomes worse than absolute threshold) and best cell (target cell becomes better than serving cell).

Table 1 and FIG. 12 also indicate that reporting configurations RC1, RC3 and RC5 are each linked to multiple measurement objects. For example, RC5 is linked to MO2 through measurement identity ID6 and linked to MO4 through measurement identity ID8. An example of this is when there are two different WCDMA frequencies, i.e., two measurement objects. In bad coverage, it would be preferable for the UE to search for suitable cells on both WCDMA frequencies in which case the same report configuration can be used for both of the WCDMA measurement objects.

Note that in Table 1 and in FIG. 12, each measurement identity is structured to link one measurement object with one reporting configuration. While this may be preferred, this is not a strict requirement. A single measurement identity can be structured to link at least one measurement object with at least one reporting configuration.

For the remainder of this disclosure, it will be assumed that each measurement identity links one measurement object with one reporting configuration. When structured in this manner, any two measurement identities can link the same measurement object to different reporting configurations such as ID1 and ID2. Conversely, any two measurement identities can link two different measurement objects to the same reporting configuration such as ID2 and ID3. Such measurement identity structure essentially converts the many-to-many mappings between the measurement objects and the reporting configurations into a plurality of measurement identities that link individual measurement object to individual reporting configuration.

Referring back to FIG. 6, the measurements identities are generated in step 630, the measurement configuration unit 430 generates an identities prioritization in step 640 to prioritize at the measurement identities level, objects prioritization in step 650 to prioritize at the measurement objects level, and reporting prioritization in step 660 to prioritize at the reporting configurations level. Each of these will be described in further detail below. Note that steps 640, 650 and 660 are shown as alternatives. However, while not shown, the steps may be combined, for example, to indicate nested levels of prioritization. As an illustration, the measurement configuration may indicate an outer prioritization at the measurement objects level, and within each measurement objects level, prioritization at the reporting configurations can be indicated.

As noted above, the measurement configuration unit 430 generates the identities prioritization, which is to be included in the measurement configuration, in step 640. The measurement configuration prioritization includes the identities prioritization at least in part. In this step, each measurement identity is associated with an identity priority. The identity priority associated with any one measurement identity may be unique or may be the same as identity priorities associated with one or more other measurement identities. The identities prioritization generated in step 640 indicates that the UE 130 is to perform measurements in accordance with the measurements objects linked to the measurement identities in order starting with the measurement identity with the highest identity priority.

One example solution to prioritize the measurement identities is to order the measurement identities in an identity priority sequence in the measurement configuration. In this solution, the measurement identities generated in step 630 may be ordered in step 640. Of course, steps 630 and 640 may be combined as a single step to generate the measurement identities in the required order. Referring to FIG. 12 and to Table 1 again, if it is assumed that the measurement identities ID 1 is of the highest identity priority and ID9 is of the lowest identity priority, then the measurement configuration would simply list ID1 through ID9 in order.

While indicating priority through a sequence is relatively simple to implement, it does limit the ability to prioritize measurements that already exist in the UE 130 against any new measurements. When a measurement identity changes, ongoing measurement filter will most likely be reset. That is, measurements that have built the filter will be removed.

Thus, for a greater degree of control, it may be preferred that the priority of each measurement identity be explicitly indicated. Thus, in step 640 of another example solution, the measurement configuration unit 430 generates one or more identity prioritization indicators. The identities prioritization can be indicated, at least in part, by the identity prioritization indicators. This solution allows for the possibility to prioritize measurements that already exist in the UE 130 against the new measurements. It also gives the ability to reprioritize any existing measurements in the UE 130.

Preferably, each identity prioritization indicator has a one-to-one correspondence with one of the measurement identities. Under this solution, the measurement identities ID1-ID9 in Table 1 and FIG. 12 would each have a corresponding identity prioritization indicator, such as an integer or a label, which can be compared to other identity prioritization indicators.

In E-UTRAN, step 640 may be implemented in one aspect as follows. For each measID IE that is included in the measIDToAddModList in the MeasConfig IE, an identity prioritization indicator parameter can be added as shown below:

```
MeasIdToAddModList ::= SEQUENCE(SIZE(1..maxMeasID))
                              OF MeasIdToAddMod
MeasIdToAddMod ::= SEQUENCE {
    measId            MeasId,
    measObjectId      MeasObjectId,
    reportConfigId    ReportConfigId,
    measIdPriority    MeasIdPriority  DEFAULT 1
}
MeasIdPriority ::=    INTEGER (1..maxMeasIdPriority)
```

The measIdPriority IE would serve as the explicit identity prioritization parameter. The UE 130 then would perform the measurements in order starting with the measID IE that has the highest measIdPriority. Note that by explicitly including the prioritization parameter measIdPriority, the measID-ToAddModList can be used to modify priorities of existing measurements in the UE 130.

As indicated above, a particular measurement object may be linked to multiple reporting configurations. Thus, it is possible that a measurement performed in accordance with a measurement object linked to one measurement identity can satisfy the reporting criterion of reporting configurations linked to one or more measurement identities. For example, in FIG. 12 and in Table 1 above, when measurement identity ID3 is processed, the UE 130 may perform measurements in accordance with measurement object MO2, and the UE 130 will report to the eNodeB 110 if the criterion of the linked reporting configuration RC3 is satisfied. But it is seen that MO2 is also linked to reporting configurations RC1 and RC5, which if the criterion is satisfied, the UE 130 can also make reports to the eNodeB 110 in accordance with RC1 and/or RC5. Thus, in one aspect, the UE 130 may make several measurements reports based on one measurement. Preferably, the reports will be prioritized based on the identities prioritization.

In step 650 of FIG. 6, the measurements are prioritized at the measurement objects level. In this step, the measurement configuration unit 430 generates an objects prioritization to be included in the measurement configuration. The measurement configuration prioritization may include the objects prioritization at least in part. At the measurement objects level, each measurement object may be associated an object priority. The object priority associated with any one measurement object may be unique or may be the same as the object priorities associated with one or more other measurement objects. The objects prioritization indicates that the UE 130 is to perform measurements on the measurement objects in order starting with the measurement object with the highest object priority.

One example solution to prioritize the measurement objects is to order the measurement objects in an object priority sequence. If in FIG. 12 and Table 1 it is assumed that the measurement object MO1 is of the highest object priority and MO4 is of the lowest object priority, then the measurement configuration would simply list MO1 through MO4 in order. In this solution, the measurement objects generated in step 610 may be ordered in step 650. Of course, steps 610 and 650 may be combined as a single step to generate the measurement objects in the required order.

But again for a greater degree of control and to allow prioritizing of measurements that already exist in the UE 130, it may be preferred that the priority of each measurement object be explicitly indicated. Thus, in step 650 of another example solution, the measurement configuration unit 430 generates one or more object prioritization indicators. The objects prioritization can be indicated, at least in part, by the object prioritization indicators. This solution allows for the possibility to prioritize measurements that already exist in the UE 130 against the new measurements. It also gives the ability to reprioritize any existing measurements in the UE 130 at the measurement objects level.

Preferably, each object prioritization indicator has a one-to-one correspondence with one of the measurement objects. Under this solution, the measurement objects MO1-MO4 in Table 1 and FIG. 12 would each have a corresponding object prioritization indicator, such as an integer or a label, which can be compared to other object prioritization indicators.

In E-UTRAN, step 650 may be implemented as follows in one aspect. For each measObjectId IE that is included in the measObjectToAddModList in the MeasConfig IE, an object prioritization indicator parameter can be added as shown below:

```
MeasObjectToAddModList ::= SEQUENCE(SIZE(1..maxObjectID))
                            OF MeasObjectToAddMod
MeasObjectToAddMod ::= SEQUENCE {
   measObjectId      MeasObjectId,
   measObject        CHOICE {
      measObjectEUTRA             MeasObjectEUTRA,
      measObjectUTRA              MeasObjectUTRA,
      measObjectGERAN             MeasObjectGERAN,
      measObject ObjectCDMA2000   MeasObjectCDMA2000,
      ...
   },
   measObjectPriority  MeasObjectPriority  DEFAULT 1
}
MeasObjectPriority ::= INTEGER (1..maxMeasObjectPriority)
```

The measObjectPriority IE would serve as the explicit object prioritization parameter. The UE 130 then would perform the measurements in priority order starting with the measObject IE that has the highest measObjectPriority. Note that by explicitly including the prioritization parameter measObjectPriority, the measObjectToAddModList can be used to modify priorities of existing measurements in the UE 130.

Again, it is possible that the measurement performed accordance with a measurement object can satisfy the reporting criterion of several reporting configurations. Thus, the UE 130 may make several measurements reports based on one measurement. Preferably, the reports will be prioritized based on the objects prioritization.

In step 660, the measurement is prioritized at the reporting configurations level. In this step, the measurement figuration unit 430 generates a reporting prioritization to be included in the measurement configuration. The measurement configuration prioritization may include the reporting prioritization at least in part. At the reporting configurations level, each reporting configuration may be associated a reporting priority. The reporting priority associated with any one reporting configuration may be unique or may be the same as the reporting priorities associated with one or more other reporting configurations. The reporting prioritization indicates that the UE 130 is to perform measurements on the measurement objects linked to the reporting configurations in order starting with the reporting configuration with the highest reporting priority.

Similar to prioritizing at the measurement identities and measurement objects levels, one example solution to prioritize the reporting configurations is to order the reporting configurations in a reporting priority sequence. If in FIG. 12 and Table 1 it is assumed that the reporting configuration RC1 is of the highest reporting priority and RC5 is of the lowest reporting priority, then the measurement configuration would simply list RC1 through RC5 in order. In this solution, the reporting configurations generated in step 620 may be ordered in step 660. Of course, steps 620 and 660 may be combined as a single step to generate the reporting configurations in the required order.

But again for a greater degree of control and to allow prioritizing of existing measurements, it may be preferred that the priority of each reporting configuration be explicitly indicated. Thus, in step 660 of another example solution, the measurement configuration unit 430 generates one or more reporting prioritization indicators. The reporting prioritization can be indicated, at least in part, by the reporting prioritization indicators. This solution allows for the possibility to prioritize measurements that already exist in the UE 130 against the new measurements. It also gives the ability to reprioritize any existing measurements in the UE 130 at the reporting configurations level.

Preferably, each reporting prioritization indicator has a one-to-one correspondence with one of the reporting configurations. Under this solution, the reporting configurations RC1-RC5 in Table 1 and FIG. 12 would each have a corresponding reporting prioritization indicator, such as an integer or a label, which can be compared to reporting object prioritization indicators.

In E-UTRAN, step 660 may be implemented as follows in one aspect. For each reportConfigId IE that is included in the reportConfigToAddModList in the MeasConfig IE, a reporting prioritization indicator parameter can be added as shown below:

```
ReportConfigToAddModList ::=
SEQUENCE(SIZE(1..maxReportConfigID))
                                    OF ReportConfigToAddMod
ReportConfigToAddMod ::= SEQUENCE {
    reportConfigId           ReportConfigId,
    reportConfig             CHOICE {
        reportConfigEUTRA        ReportConfigEUTRA,
        reportConfigInterRAT     ReportConfigInterRAT
    },
    reportConfigPriority  ReportConfigPriority  DEFAULT 1
}
ReportConfigPriority ::= INTEGER (1..maxReportConfigPriority)
```

The reportConfigPriority IE would serve as the explicit reporting prioritization parameter. The UE 130 then would perform the measurements in priority order starting with the measObject IE that is linked to the reportConfig that has the highest reportConfigPriority. Note that by explicitly including the prioritization parameter reportConfigPriority, the reportConfigToAddModList can be used to modify priorities of existing measurements in the UE 130.

Again, it is possible that the measurement performed accordance with a measurement object can satisfy the reporting criterion of several reporting configurations. Thus, the UE 130 may make several measurements reports based on one measurement object. Preferably, the reports will be prioritized based on the reporting prioritization.

Figure 7:
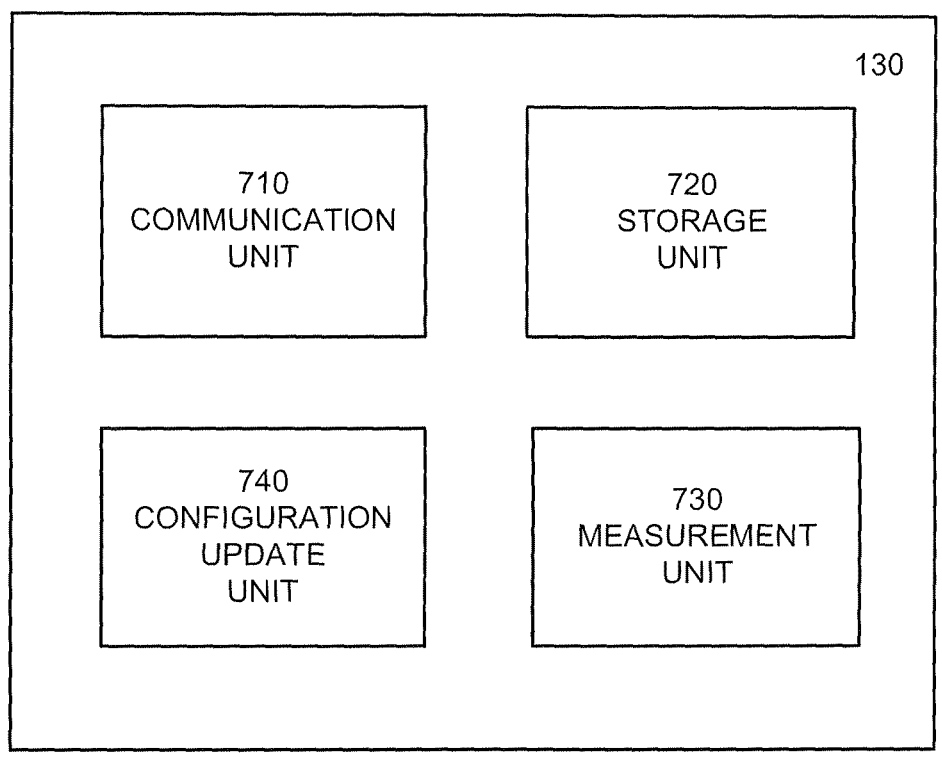
FIG. 7 illustrates an example embodiment of a wireless terminal structured to perform and report on measurements.

While the eNodeB 110 generates the measurement configuration, it is the UE 130 that performs the measurements and reports on the measurements made. FIG. 7 illustrates an example embodiment of a UE 130 (more generally a wireless terminal) structured to perform and report on measurements. As seen, the UE 130 includes a communication unit 710, a storage unit 720, a measurement unit 730 and configuration update unit 740. Further details of these units will be provided in conjunction with the description of the method illustrated in FIG. 8. It should be noted that FIG. 7 is a logical representation of the UE 130. Also, it is contemplated that the UE 130 can be implemented as a combination of hardware and software components. It is also contemplated that the UE 130 can include one or more processors executing programming instructions stored in a non-transitory computer readable medium to perform the functions of the units.

Figure 8:
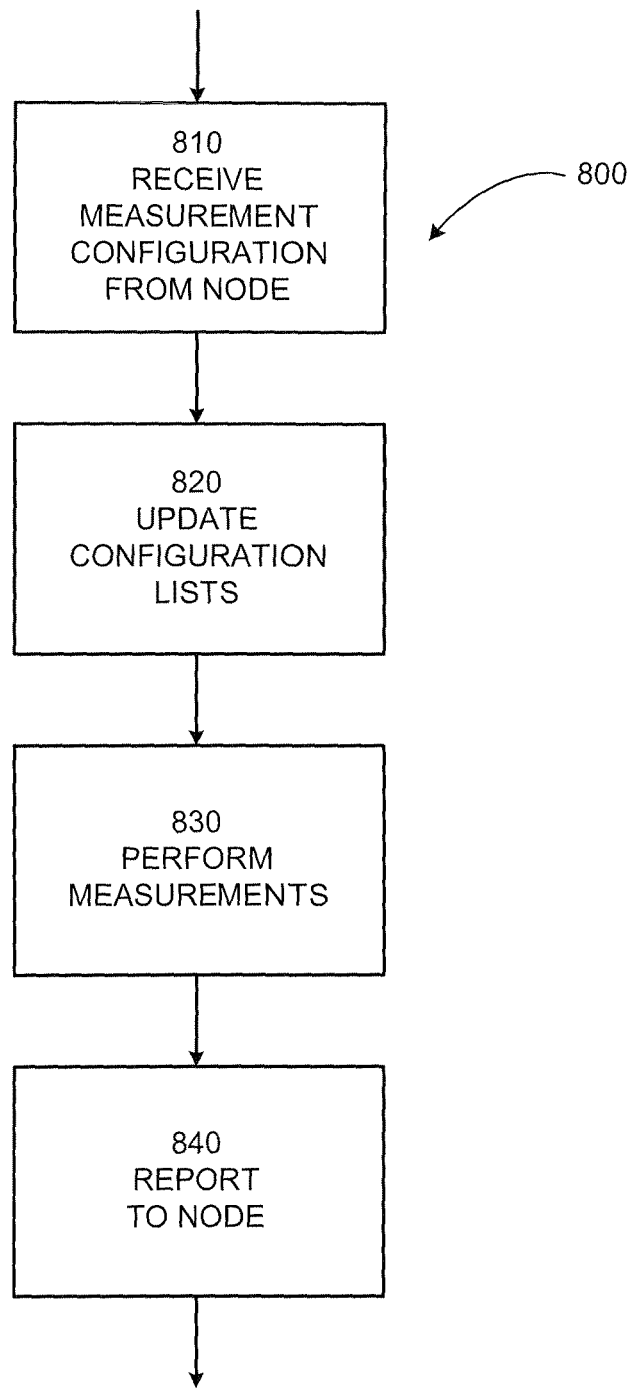
FIG. 8 illustrates an example method performed at or on behalf of a node of a wireless network to configure measurements.

FIG. 8 illustrates an example method 800 to make measurements and to report on the measurements made. As seen, the communication unit 710 receives the measurement configuration from the eNodeB 110 in step 810. The measurement objects, reporting configurations and measurement identities may be stored in the storage unit 720. Note that the storage unit 720 may also be used to store information necessary for the UE 130 to operate. In step 820, the configuration update unit 740 can update the list of the measurement objects, reporting configurations, and the measurement identities based on the received measurement configuration such that the prioritization indicated in the measurement configuration is reflected in the updated objects, configurations and identities.

In step 830, the measurement unit 730 performs measurements of one or more wireless signals transmitted from one or more cells in one or more RATs in accordance with the measurement configuration. The measurements are made in a priority order in accordance with the measurement configuration prioritization. In step 840, the communication unit 710 reports the measurements made to the eNodeB in accordance with the measurement configuration. For example, when the reporting configuration indicates the report format, the communication unit 710 complies with the format in making the report. In an alternative, the communication unit 710 may make a report in compliance with a predetermined format.

Figure 9A:
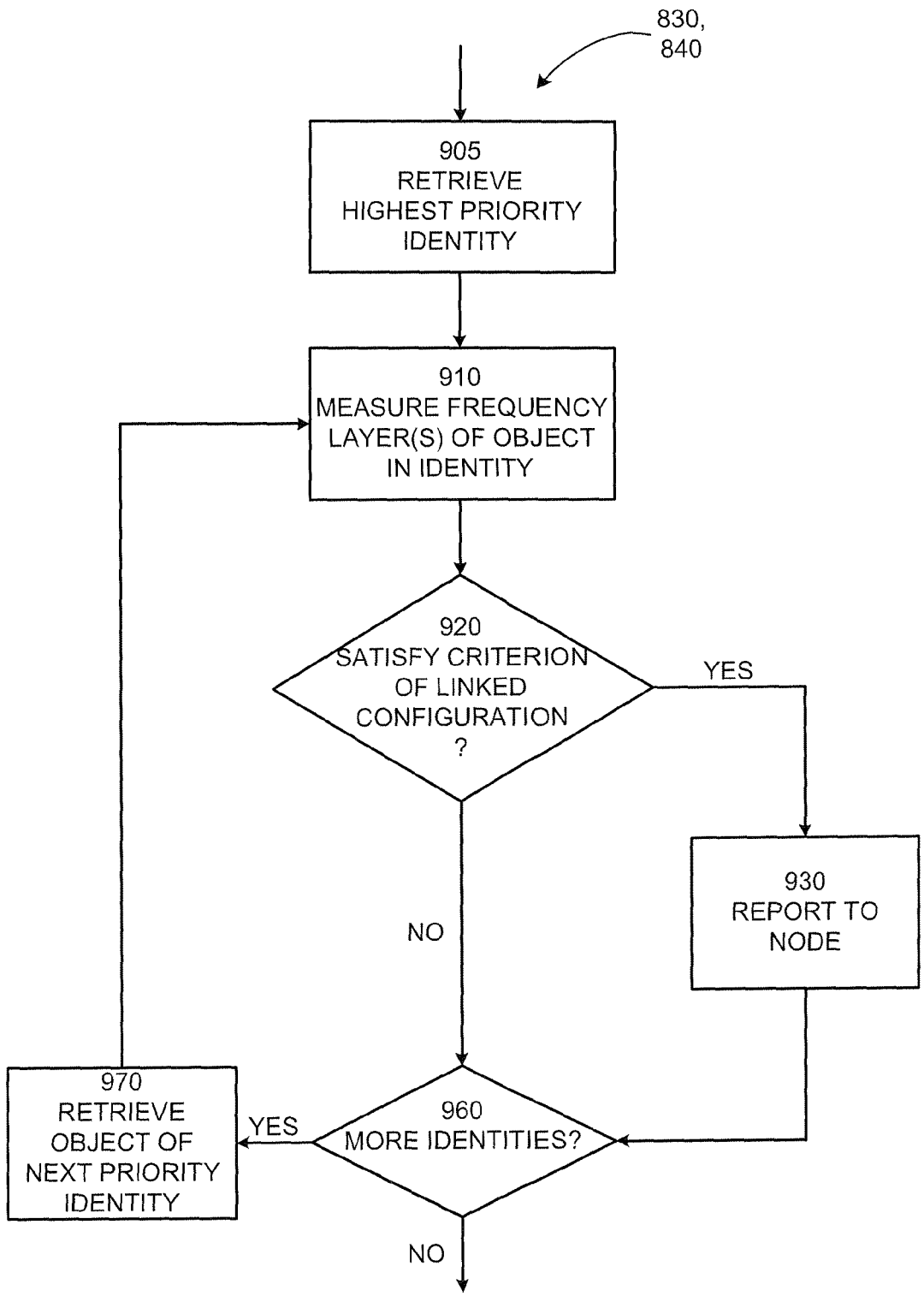
FIGS. 9A, 9B, 10, 11A and 11B illustrate an example processes to perform measurements and to report on the made measurements.

When the identities prioritization is included in the measurement configuration, the UE 130 is to perform measurements on the measurement objects of the measurement identities in the order starting with the measurement identity with the highest identity priority. FIG. 9A illustrates an example process to perform and report measurements prioritized at the measurement identities level. In step 905, the measurement unit 730 retrieves the measurement identity with the highest priority. In step 910, the measurement unit 730 measures the frequency layer of the measurement object linked to the retrieved measurement identity. In step 920, the measurement unit 730 determines whether the performed measurement satisfies the criterion of the reporting configuration linked to the retrieved measurement identity. If so, the process moves to step 930. Otherwise, the process moves to step 960. In step 930, the communication unit 710 reports to the eNodeB 110 information related to the measurement when it is determined that the measurement satisfies the criterion of the linked reporting configuration. In step 960, the measurement unit 730 determines whether there are more measurement identities to be processed. If so, the measurement unit 730 retrieves the measurement identity with the next highest priority is retrieved in step 970 and the steps of the process are repeated.

Note that the steps 905, 960, and 970 of the flow chart are such that at step 910, the frequency layer of the measurement object linked to each measurements identity is measured in order starting with the measurement identity with the highest identity priority.

The process illustrated in FIG. 9A processes each measurement identity one by one. When a measurement is made in accordance with a measurement object linked to a measurement identity, the measurement may satisfy the reporting criterion of reporting configurations of the linked reporting configuration. However, recall that a measurement object can be linked to multiple reporting configurations. Thus, the same measurement may also satisfy the reporting criterion of reporting configurations linked to other measurement identities as well.

As an illustration, again refer to FIG. 12 and Table 1 and assume that the measurement identities are prioritized in the order of ID1-ID9. If the process illustrated in FIG. 9A is followed, then a total of 9 measurements will be made by the measurement unit 730—two in accordance with MO1, three in accordance with MO2, one in accordance with MO3, and two in accordance with MO2. Thus, it is seen that some measurements will be performed repeatedly.

Figure 9B:
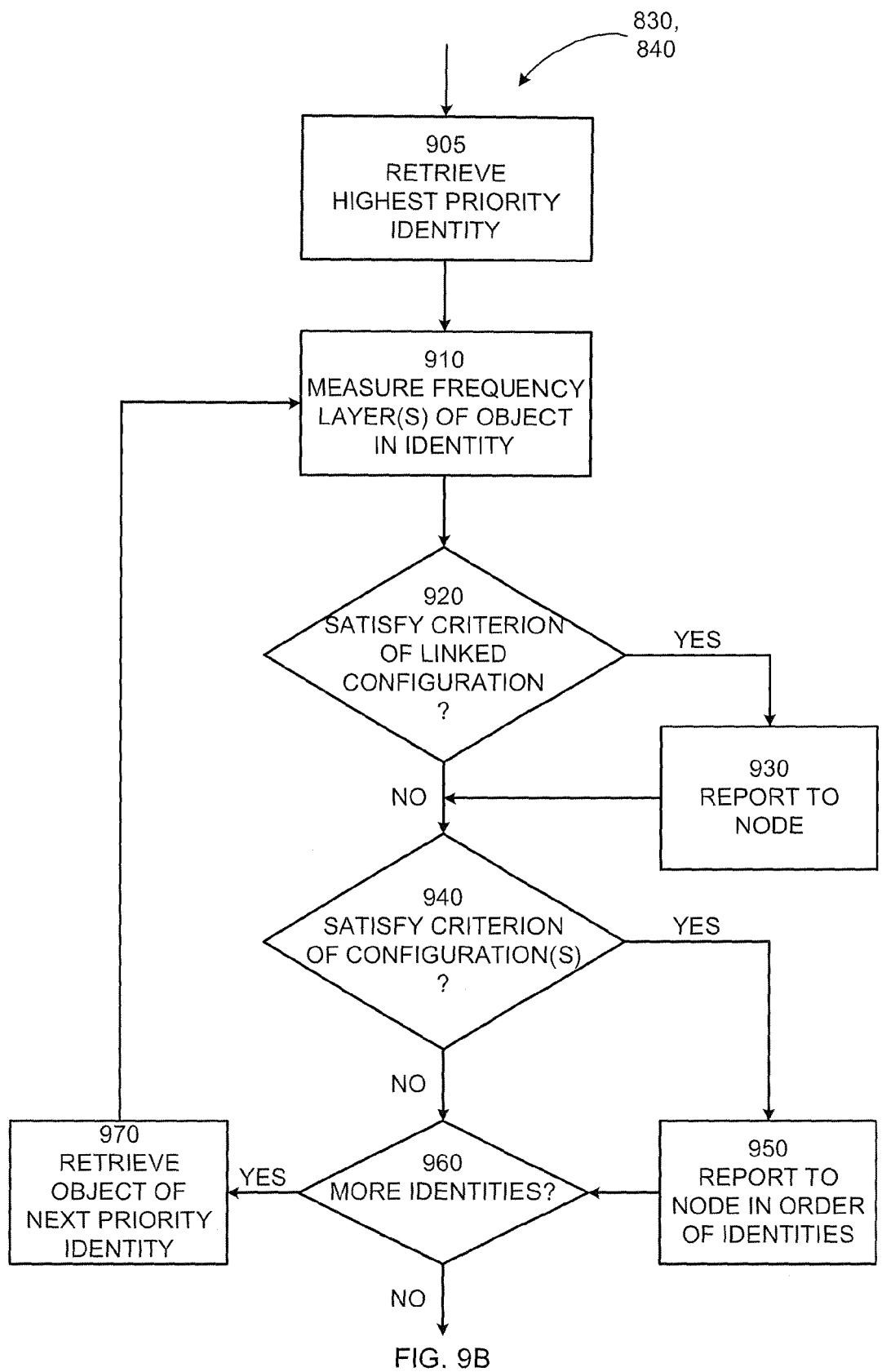

But it could be that one measurement may satisfy the criterion of multiple reporting configurations. In those instances, efficiency can be achieved by making the measurement reports for all measurement identities whose linked reporting configurations have their criterions satisfied by the measurement. FIG. 9B illustrates another example process to perform and report measurements at the measurement identities level that can be more efficient than the process illustrated in FIG. 9A. Steps 905, 910, 920, 930, 960 and 970 in FIG. 9B are similar to the steps in FIG. 9A, and thus will not be described in detail.

Steps 940 and 950 are added in FIG. 9B. In step 940, the measurement unit 730 determines whether the performed measurement satisfies the criterion of any of the reporting configurations. In step 950, the communication unit 710 reports to the eNodeB 110 information related to the measurement for each measurement identity linked to the reporting configuration whose reporting criterion is satisfied by the measurement. The measurements reports are such that among the measurement identities linked to the reporting configurations whose reporting criterion is satisfied by the measurement made in step 910, the reports are made in order of identity priorities of the measurement identities, from highest to lowest.

For example, assume that measurement identity ID3, which links MO2 and RC3, is being processed. Then in step 910, measurements in accordance with the measurement object MO2 will be performed, and the measurement result may satisfy the criterion of the linked reporting configuration RC3. But in step 940, the measurement unit 730 determines whether the same measurement also satisfy the criterions of reporting configurations RC1 and RC5 which are linked to the same measurement object MO2 through measurement identities ID4 and ID6, respectively. When this occurs, then in step 950, the communication unit 710 reports to the eNodeB 110 information related to the measurement for measurement identities in the order of ID3, ID4 and ID6.

To avoid unnecessary measurement repetitions, the measurement identities for which the measurement reports have been made in steps 930 and 950 may be removed prior to performing step 960. For example, in the scenario illustrated described above, measurement identities ID3, ID4 and ID6 may be removed.

Figure 10:
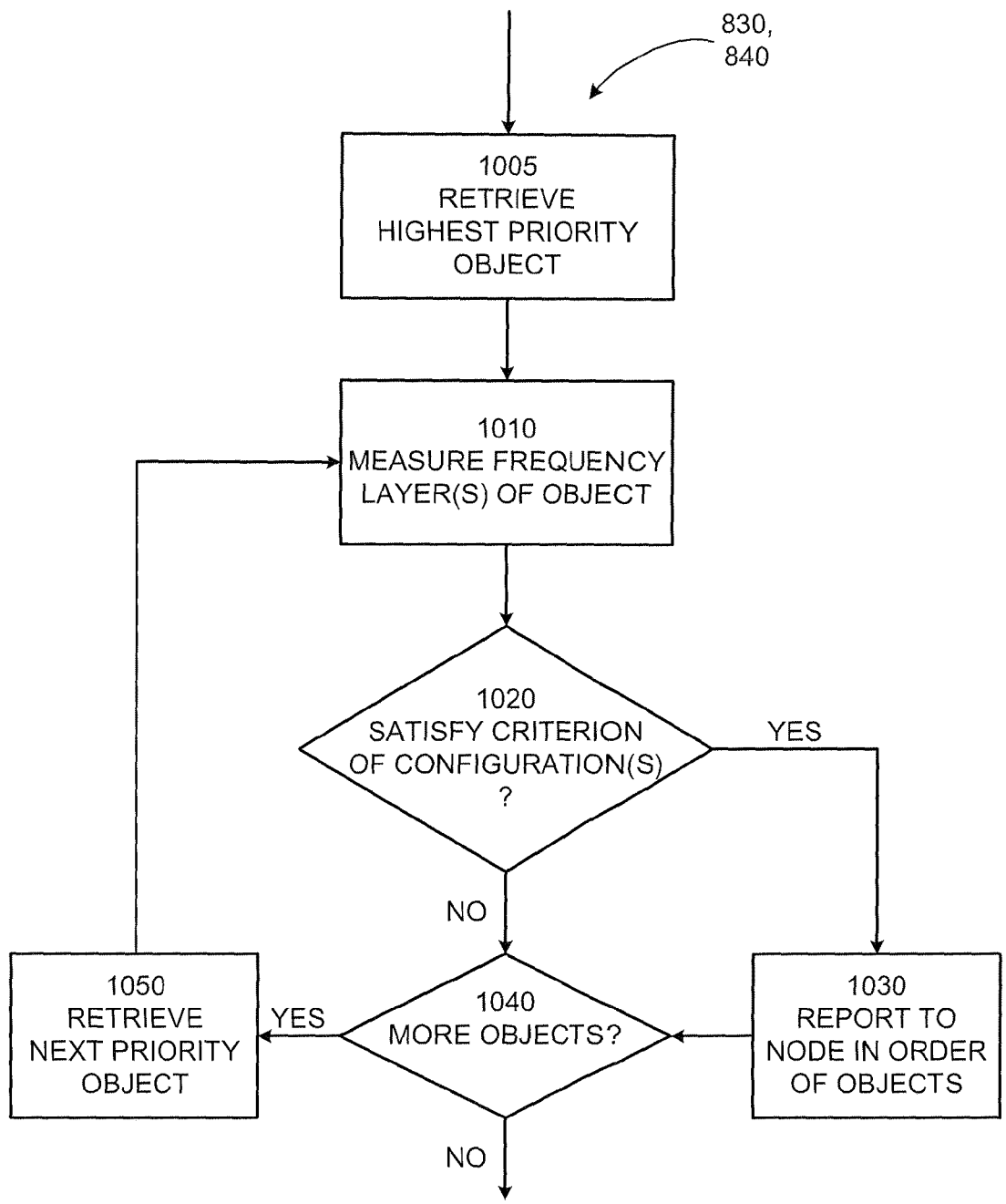

If the measurement configuration includes an objects prioritization, this indicates that the UE 130 is to perform measurements on the measurement objects in order starting with the object with the highest object priority. FIG. 10 illustrates an example process to perform and to report on measurements prioritized at the measurement objects level. In step 1010, the measurement unit 730 measures the frequency layer of each measurement object in order starting with the measurement object having the highest object priority. Then in step 1020, the measurement unit 730 determines whether the performed measurement satisfies the criterion of any of the reporting configurations linked to the measurement object. In step 1030, the communication unit 710 reports to the node 110 information related to the measurement for each linked reporting configuration whose criterion is satisfied by the measurement starting with the measurement object whose object priority is highest among the measurement objects linked to the reporting configurations with satisfied criterion.

Note that when the measurement is made in accordance with each measurement object, multiple reports may be made. For example, when measurement for MO1 is made in the above illustrated example scenario, the measurement may satisfy the criterion for both reporting configurations RC1 and RC3.

Figure 11A:
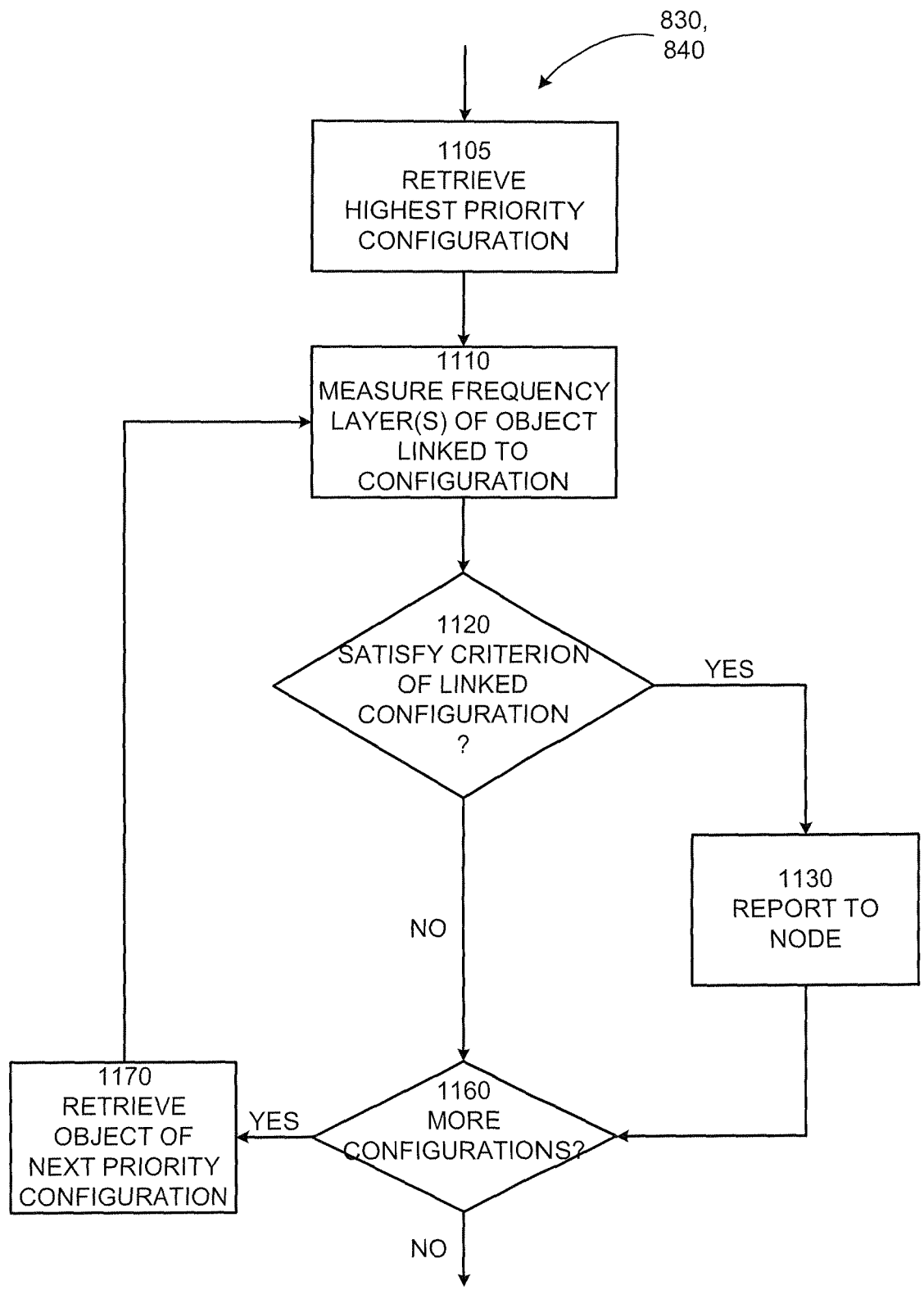

If the measurement configuration includes a reporting prioritization, this indicates that the UE 130 is to perform measurements on the measurement objects linked to the reporting configurations in order starting with the reporting configuration with the highest reporting priority. FIG. 11A illustrates an example process in which the measurements and reports are made for measurement configurations prioritized at the reporting configurations level. In step 1110, the measurement unit 730 measures the frequency layer of each measurement object linked to the reporting configuration in order starting with the reporting configuration with the highest reporting priority. The measurement configuration unit 730 determines whether the performed measurement satisfies the criterion indicated in the reporting configuration in step 1120. If so, the process moves to step 1130. Otherwise, the process moves to step 1160. In step 1130, the communication unit 710 reports to the eNodeB 110 information related to the measurement or measurements when it is determined that the measurement or measurements satisfy the criterion indicated in the reporting configuration.

Regarding FIG. 12 and Table 1, if it is assumed that RC1-RC5 represent the prioritization of the reporting configurations, then RC1 would be processed the first time through. In step 1110, the measurement unit 730 makes measurements according to measurement objects MO1 and MO2, which are linked to RC1. In step 1120, the measurement unit 730 determines whether the measurement made in accordance with MO1 satisfies the reporting criterion of RC1, and also determines whether the measurement made in accordance with MO2 satisfies the same criterion. In step 1130, the communication unit 710 reports to the eNodeB 110 information related to the MO1 measurement when the reporting criterion of RC1 is satisfied by the MO1 measurement, and also reports information related to the MO2 measurement when the reporting criterion of RC1 is satisfied by MO2 measurement.

In step 1160, the measurement unit 730 determines whether there are more reporting configurations to be processed. If so, the measurement unit 730 retrieves the reporting configuration with the next highest priority is retrieved and the steps of the process are repeated.

Figure 11B:
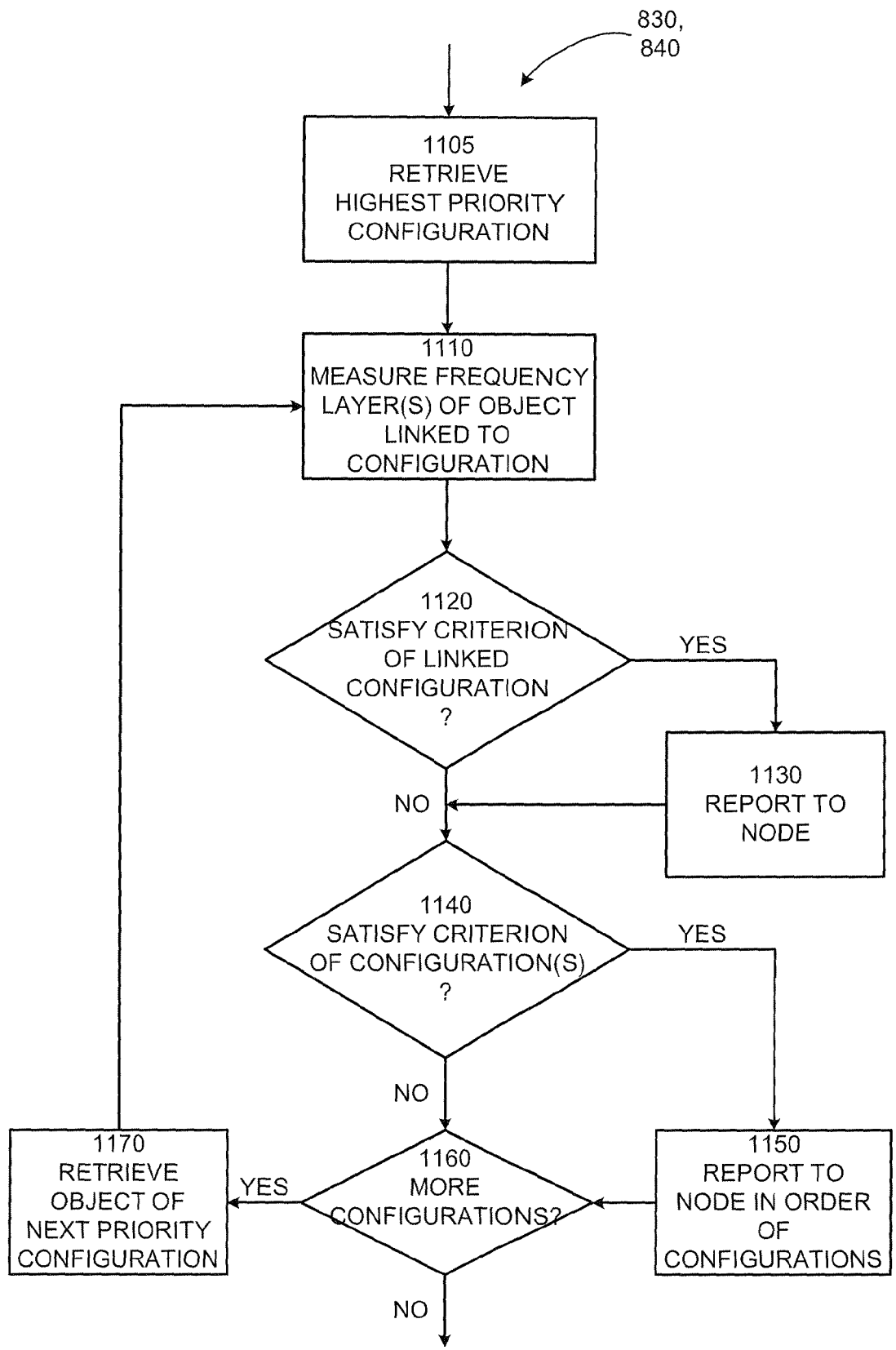

In another example process in which the measurements and reports are made for measurement configurations prioritized at the reporting configurations level, efficiency may be achieved by reducing or eliminating unnecessary measurements as illustrated in FIG. 11B. Steps 1105, 1110, 1120, 1130, 1160 and 1170 in FIG. 11B are similar to the same steps in FIG. 11A, and thus will not be described in detail.

Steps 1140 and 1150 are added in FIG. 11B. In step 1140, the measurement unit 730 determines whether the performed measurement(s) satisfy the criterion indicated in any of the reporting configurations. In step 1150, the communication unit 710 reports to the eNodeB 110 information related to the measurement for each reporting configuration whose reporting criterion is satisfied by the measurement(s). The measurements reports such that among the reporting configurations whose reporting criterion is satisfied by the measurement(s), the reports are made in order of reporting priorities of the reporting configurations, from highest to the lowest.

In FIG. 12 and Table 1, when RC1 is processed, it is noted that the measurement unit 730 makes measurements according to measurement objects MO1 and MO2 in step 1110. But these measurement objects are also linked to reporting configurations RC3 and RC5. Thus, in step 1140, the measurement unit 730 determines whether the measurements for MO1 and MO2 also satisfy the criterion of RC3 and RC5, in addition to the criterion of RC1. Assuming that the reporting criterion of RC1, RC3 and RC5 are all satisfied, then in step 1150, the communication unit 710 sends reports in order of RC1, RC3 and RC5.

To avoid unnecessary measurement repetitions, the measurement identities for which the measurement reports have been made in steps 1130 and 1150 may be removed prior to performing step 1160. For example, in the scenario illustrated described above, reporting configurations RC1, RC3 and RC5 may be removed leaving RC2 and RC4 to be processed.

There are many advantages to the disclosed subject matter. Some (not necessarily exhaustive) advantages include the following. First, with the ability to prioritize the measurements, the eNodeB 110 can order measurements on several frequencies/RATs at the same time, i.e., in one measurement configuration message, while still being able to control in which order they shall be performed. This will reduce the time from that the first message configuration message is sent to the UE 130 until the UE 130 sends a measurement report. The reduced time decreases the risk of dropping the UE due to too late measurement report.

This will also reduce the number of required measurement configuration messages. It is enough to send one message with all measurements instead of sending several messages separated by a timer. The reduced number of measurement configuration messages reduces the risk of dropping the UE due to signaling.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a node of a wireless network to configure measurements, the method comprising:
   generating a measurement configuration for a wireless terminal of the wireless network, wherein the step of generating the measurement configuration comprises:
      generating one or more measurement objects, each measurement object indicating a frequency layer to be measured by the wireless terminal, and each frequency layer including one or more frequencies of a particular radio access technology;
      generating one or more reporting configurations, each reporting configuration indicating a criterion that triggers the wireless terminal to send a measurement report to the node;
      generating one or more measurement identities, each measurement identity linking a measurement object and a reporting configuration to each other such that when the criterion of the linked reporting configuration is satisfied, the wireless terminal sends the measurement report related to the linked measurement object; and
      generating an identities prioritization indicating that the wireless terminal is to perform measurements in accordance with the measurement objects in order starting with the measurement object linked to the measurement identity with a highest identity priority, wherein the measurement configuration prioritization includes the identities prioritization; and
   sending the measurement configuration to the wireless terminal,
   wherein the measurement configuration comprises a measurement configuration prioritization indicating a prioritization of measurements to be performed by the wireless terminal for reporting to the node, the measurements to be performed being measurements of one or more wireless signals transmitted from one or more cells in one or more radio access technologies.

2. The method of claim 1, wherein the step of generating the identities prioritization comprises ordering the measurement identities in an identity priority sequence.

3. The method of claim 1, wherein the step of generating the identities prioritization comprises generating one or more identity prioritization indicators, each identity prioritization indicator having a one-to-one correspondence with one of the measurement identities such that the identities prioritization is indicated by the identity prioritization indicators.

4. The method of claim 1, wherein the step of generating the measurement configuration comprises:
   generating one or more measurement objects, each measurement object indicating a frequency layer to be measured by the wireless terminal, and each frequency layer including one or more frequencies of a particular radio access technology;
   generating one or more reporting configurations, each reporting configuration indicating a criterion that triggers the wireless terminal to send a measurement report to the node;
   generating one or more measurement identities, each measurement identity linking a measurement object and a reporting configuration to each other such that when the criterion of the linked reporting configuration is satisfied, the wireless terminal sends the measurement report related to the linked measurement object; and
   generating an objects prioritization indicating that the wireless terminal is to perform measurements in accordance with the measurement objects in order starting with the measurement object with a highest object priority,
   wherein the measurement configuration prioritization includes the objects prioritization.

5. The method of claim 4, wherein the step of generating the objects prioritization comprises ordering the measurement objects in an object priority sequence.

6. The method of claim 4, wherein the step of generating the objects prioritization comprises generating one or more object prioritization indicators, each object prioritization indicator having a one-to-one correspondence with one of the measurement objects such that the objects prioritization is indicated by the object prioritization indicators.

7. The method of claim 1, wherein the step of generating the measurement configuration comprises:
   generating one or more measurement objects, each measurement object indicating a frequency layer to be measured by the wireless terminal, and each frequency layer including one or more frequencies of a particular radio access technology;
   generating one or more reporting configurations, each reporting configuration indicating a criterion that triggers the wireless terminal to send a measurement report to the node;
   generating one or more measurement identities, each measurement identity linking a measurement object and a reporting configuration to each other such that when the criterion of the linked reporting configuration is satisfied, the wireless terminal sends the measurement report related to the linked measurement object; and generating a reporting prioritization indicating that the wireless terminal is to perform measurements in accordance with the measurement objects in order starting with the measurement object linked to the reporting configuration with a highest reporting priority, wherein the measurement configuration prioritization includes the reporting prioritization.

8. The method of claim 7, wherein the step of generating the reporting prioritization comprises ordering the reporting configurations in reporting priority sequence.

9. The method of claim 7, wherein the step of generating the reporting prioritization comprises generating one or more reporting prioritization indicators, each reporting prioritization indicator having a one-to-one correspondence with one of the reporting configurations such that the reporting prioritization is indicated by the reporting prioritization indicators.

10. The method of claim 1,
wherein the measurement configuration comprises:
one or more measurement objects, each measurement object indicating a frequency layer to be measured by the wireless terminal, and each frequency layer including one or more frequencies of a particular radio access technology,
one or more reporting configurations, each reporting configuration indicating a criterion that triggers the wireless terminal to send a measurement report to the node, and
one or more measurement identities, each measurement identity linking a measurement object and a reporting configuration to each other such that when the criterion of the linked reporting configuration is satisfied, the wireless terminal sends the measurement report related to the linked measurement object,
wherein the measurement configuration further comprises at least two of an identities prioritization, an objects prioritization, and a reporting prioritization, in which
the identities prioritization indicates that the wireless terminal is to perform measurements in accordance with the measurement objects in order starting with the measurement object linked to the measurement identity with a highest identity priority,
the objects prioritization indicates that the wireless terminal is to perform measurements in accordance with the measurement objects in order starting with the measurement object with a highest object priority, and
the reporting prioritization indicates that the wireless terminal is to perform measurements in accordance with the measurement objects in order starting with the measurement object linked to the reporting configuration with a highest reporting priority, and
wherein the measurement configuration prioritization includes nested levels of prioritization among the at least two of the identities prioritization, the objects prioritization, and the reporting prioritization.

11. The method of claim 1, wherein the measurement configuration commands the wireless terminal to performs the measurements.

12. A method performed at a wireless terminal of a wireless network to make and report on measurements, the method comprising:
receiving a measurement configuration from a node of the wireless network, the measurement configuration comprising a measurement configuration prioritization indicating a prioritization of measurements to be performed by the wireless terminal for reporting to the node,
wherein the measurement configuration comprises:
one or more measurement objects, each measurement object indicating a frequency layer to be measured by the wireless terminal, and each frequency layer including one or more frequencies of a particular radio access technology,
one or more reporting configurations, each reporting configuration indicating a criterion that triggers the wireless terminal to send a measurement report to the node,
one or more measurement identities, each measurement identity linking a measurement object and a reporting configuration to each other such that when the criterion of the linked reporting configuration is satisfied, the wireless terminal sends the measurement report related to the linked measurement object, and
an identities prioritization indicating that the wireless terminal is to perform measurements in accordance with the measurement objects in order starting with the measurement object linked to the measurement identity with a highest identity priority, and
wherein the step of performing the measurements and the step of reporting at least a portion of the measurements comprise, for each measurement identity in order starting with the measurement identity with the highest identity priority:
measuring the frequency layer of the measurement object linked to that measurement identity;
determining whether that measurement satisfies the criterion of the reporting configuration linked to that measurement identity; and
reporting to the node information related to that measurement when that measurement satisfies the criterion of the reporting configuration linked to that measurement identity;
performing measurements of one or more wireless signals transmitted from one or more cells in one or more radio access technologies in accordance with the measurement configuration and in a priority order in accordance with the measurement configuration prioritization; and
reporting at least a portion of the measurements to the node in accordance with the measurement configuration.

13. The method of claim 12, wherein the step of performing the measurements and the step of reporting at least a portion of the measurements further comprise, for each measurement made in accordance with the measurement object linked to that measurement identity:
determining whether that measurement satisfies the criterion of any of the reporting configurations linked to the measurement object; and
reporting to the node information related to that measurement for each measurement identity linked to a reporting configuration whose criterion is satisfied by that measurement,
wherein among the measurement identities linked to the reporting configurations whose reporting criterion is satisfied by that measurement, the reports are made in order of identity priorities of the measurement identities.

14. The method of claim 12,
wherein the measurement configuration comprises:
one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, one or more measurement identities, each measurement identity linking a measurement object and a reporting configuration to each other such that when the criterion of the linked reporting configuration is satisfied, the wireless terminal sends the measurement report related to the linked measurement object, and an objects prioritization indicating that the wireless terminal is to perform measurements in accordance with the measurement objects in order starting with the measurement object with a highest object priority, and wherein the step of performing the measurements and the step of reporting at least a portion of the measurements comprise, for each measurement object in order starting with the measurement object with the highest object priority:

measuring the frequency layer of that measurement object;

determining whether that measurement satisfies the criterion of any of the reporting configurations linked to that measurement object; and reporting to the node information related to that measurement for each reporting configuration linked to that measurement object and whose criterion is satisfied by that measurement.

15. The method of claim 12, wherein the measurement configuration comprises:

one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, one or more measurement identities, each measurement identity linking a measurement object and a reporting configuration to each other such that when the criterion of the linked reporting configuration is satisfied, the wireless terminal sends the measurement report related to the linked measurement object, and a reporting prioritization indicating that the wireless terminal is to perform measurements in accordance with the measurement objects in order starting with the measurement object linked to the reporting configuration with a highest reporting priority, and wherein the step of performing the measurements and the step of reporting at least a portion of the measurements comprise, for each reporting configuration in order starting with the reporting configuration with the highest reporting priority:

measuring the frequency layer of each measurement object linked to that reporting configurations;

determining, for each measurement made, whether that measurement satisfies the criterion of that reporting configuration; and reporting to the node, for each measurement made, information related to that measurement when it is determined that measurement satisfies the criterion of that reporting configuration.

16. The method of claim 15, wherein the step of performing the measurements and the step of reporting at least a portion of the measurements further comprise, for each measurement made in accordance with the measurement object linked to that reporting configuration:

determining whether that measurement satisfies the criterion indicated in any of the reporting configurations linked to that measurement object; and reporting to the node information related to that measurement for each reporting configuration whose reporting criterion is satisfied by that measurement, wherein among the reporting configurations whose reporting criterion is satisfied by that measurement, the reports are made in order of reporting priorities of the reporting configurations.

17. The method of claim 12, further comprising updating any one or more of locally accessible measurement objects, reporting configurations, and measurement identities based on the received measurement configuration such that the measurement configuration prioritization indicated in the measurement configuration is reflected in the updated measurement objects, reporting configurations, and measurement identities.

18. The method of claim 12, wherein the measurement configuration comprises:

one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, and one or more measurement identities, each measurement identity linking a measurement object and a reporting configuration to each other such that when the criterion of the linked reporting configuration is satisfied, the wireless terminal sends the measurement report related to the linked measurement object, wherein the measurement configuration further comprises at least two of an identities prioritization, an objects prioritization, and a reporting prioritization, in which the identities prioritization indicates that the wireless terminal is to perform measurements in accordance with the measurement objects in order starting with the measurement object linked to the measurement identity with a highest identity priority, the objects prioritization indicates that the wireless terminal is to perform measurements in accordance with the measurement objects in order starting with the measurement object with a highest object priority, and the reporting prioritization indicates that the wireless terminal is to perform measurements in accordance with the measurement objects in order starting with the measurement object linked to the reporting configuration with a highest reporting priority, and wherein the measurement configuration prioritization includes nested levels of prioritization among the at least two of the identities prioritization, the objects prioritization, and the reporting prioritization.

19. The method of claim 12, wherein the measurement configuration commands the wireless terminal to performs the measurements.

20. A node structured to configure measurements of a wireless network, the node comprising:

a measurement configuration unit structured to generate a measurement configuration for a wireless terminal of the wireless network, wherein the measurement configuration comprises:
one or more measurement objects, each measurement object indicating a frequency layer to be measured by the wireless terminal, and each frequency layer including one or more frequencies of a particular radio access technology,
one or more reporting configurations, each reporting configuration indicating a criterion that triggers the wireless terminal to send a measurement report to the node,
one or more measurement identities, each measurement identity linking a measurement object and a reporting configuration to each other such that when the criterion of the linked reporting configuration is satisfied, the wireless terminal sends the measurement report related to the linked measurement object, and
an identities prioritization indicating that the wireless terminal is to perform measurements in accordance with the measurement objects in order starting with the measurement object linked to the measurement identity with a highest identity priority,
wherein the measurement configuration prioritization includes the identities prioritization; and
a communication unit structured to send the measurement configuration to the wireless terminal,
wherein the measurement configuration comprises a measurement configuration prioritization indicating a prioritization of measurements to be performed by the wireless terminal for reporting to the node, the measurements to be performed being measurements of one or more wireless signals transmitted from one or more cells in one or more radio access technologies.

21. The node of claim 20, wherein the identities prioritization is indicated by a sequence of the measurements identities.

22. The node of claim 20, wherein the measurement configuration further comprises one or more identity prioritization indicators, each identity prioritization indicator having a one-to-one correspondence with one of the measurement identities such that the identities prioritization is indicated by the identity prioritization indicators.

23. The node of claim 20, wherein the measurement configuration comprises:
one or more measurement objects, each measurement object indicating a frequency layer to be measured by the wireless terminal, and each frequency layer including one or more frequencies of a particular radio access technology,
one or more reporting configurations, each reporting configuration indicating a criterion that triggers the wireless terminal to send a measurement report to the node,
one or more measurement identities, each measurement identity linking a measurement object and a reporting configuration to each other such that when the criterion of the linked reporting configuration is satisfied, the wireless terminal sends the measurement report related to the linked measurement object, and
an objects prioritization indicating that the wireless terminal is to perform measurements in accordance with the measurement objects in order starting with the measurement object with a highest object priority,
wherein the measurement configuration prioritization includes the objects prioritization.

24. The node of claim 23, wherein the objects prioritization is indicated by a sequence of the measurements objects.

25. The node of claim 23, wherein the measurement configuration further comprises one or more object prioritization indicators, each object prioritization indicator having a one-to-one correspondence with one of the measurement objects such that the measurement objects prioritization is indicated by the object prioritization indicators.

26. The node of claim 20, wherein the measurement configuration comprises:
one or more measurement objects, each measurement object indicating a frequency layer to be measured by the wireless terminal, and each frequency layer including one or more frequencies of a particular radio access technology,
one or more reporting configurations, each reporting configuration indicating a criterion that triggers the wireless terminal to send a measurement report to the node,
one or more measurement identities, each measurement identity linking a measurement object and a reporting configuration to each other such that when the criterion of the linked reporting configuration is satisfied, the wireless terminal sends the measurement report related to the linked measurement object, and
a reporting prioritization indicating that the wireless terminal is to perform measurements in accordance with the measurement objects in order starting with the measurement object linked to the reporting configuration with a highest reporting priority,
wherein the measurement configuration prioritization includes the reporting prioritization.

27. The node of claim 26, wherein the reporting prioritization is indicated by a sequence of the reporting configurations.

28. The node of claim 26, wherein the measurement configuration further comprises one or more reporting prioritization indicators, each reporting prioritization indicator having a one-to-one correspondence with one of the reporting configurations such that the reporting prioritization is indicated by the reporting prioritization indicators.

29. The node of claim 20,
wherein the measurement configuration comprises:
one or more measurement objects, each measurement object indicating a frequency layer to be measured by the wireless terminal, and each frequency layer including one or more frequencies of a particular radio access technology,
one or more reporting configurations, each reporting configuration indicating a criterion that triggers the wireless terminal to send a measurement report to the node, and
one or more measurement identities, each measurement identity linking a measurement object and a reporting configuration to each other such that when the criterion of the linked reporting configuration is satisfied, the wireless terminal sends the measurement report related to the linked measurement object,
wherein the measurement configuration further comprises at least two of an identities prioritization, an objects prioritization, and a reporting prioritization, in which
the identities prioritization indicates that the wireless terminal is to perform measurements in accordance with the measurement objects in order starting with the measurement object linked to the measurement identity with a highest identity priority,
the objects prioritization indicates that the wireless terminal is to perform measurements in accordance with the measurement objects in order starting with the measurement object with a highest object priority, and the reporting prioritization indicates that the wireless terminal is to perform measurements in accordance with the measurement objects in order starting with the measurement object linked to the reporting configuration with a highest reporting priority, and wherein the measurement configuration prioritization includes nested levels of prioritization among the at least two of the identities prioritization, the objects prioritization, and the reporting prioritization.

30. The node of claim 20, wherein the measurement configuration commands the wireless terminal to performs the measurements.

31. A wireless terminal structured to make and report measurements of a wireless network, the wireless terminal comprising:

a communication unit structured to receive a measurement configuration from a node of the wireless network, the measurement configuration comprising a measurement configuration prioritization indicating a prioritization of measurements to be performed by the wireless terminal for reporting to the node, wherein the measurement configuration comprises:

one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, one or more measurement identities, each measurement identity linking a measurement object and a reporting configuration to each other such that when the criterion of the linked reporting configuration is satisfied, the wireless terminal sends the measurement report related to the linked measurement object, and an identities prioritization indicating that the wireless terminal is to perform measurements in accordance with the measurement objects in order starting with the measurement object linked to the measurement identity with a highest identity priority, wherein the measurement unit is structured to, for each measurement identity in order starting with the measurement identity with the highest identity priority, measure the frequency layer of the measurement object linked to that measurement identity, and to determine whether that measurement satisfies the criterion indicated in the reporting configuration linked to that measurement identity, and wherein the communication unit is structured to report to the node information related to that measurement when that measurement satisfies the criterion of the reporting configuration linked to that measurement identity; and a measurement unit structured to perform measurements of one or more wireless signals transmitted from one or more cells in one or more radio access technologies in accordance with the measurement configuration and in a priority order in accordance with the measurement configuration prioritization, wherein the communication unit is structured to report at least a portion of the measurements to the node in accordance with the measurement configuration.

32. The wireless terminal of claim 31,
wherein the measurement unit is structured to, for each measurement made in accordance with the measurement object linked to that measurement identity, determine whether that measurement satisfies the criterion of any of the reporting configuration, wherein the communication unit is structured to, for each measurement made in accordance with the measurement object linked to that measurement identity, report to the node information related to that measurement for each measurement identity linked to the reporting configuration whose reporting criterion is satisfied by that measurement, and wherein among the measurement identities linked to the reporting configurations whose reporting criterion is satisfied by that measurement, the reports are made in order of identity priorities of the measurement identities.

33. The wireless terminal of claim 31,
wherein the measurement configuration comprises:
one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, one or more measurement identities, each measurement identity linking a measurement object and a reporting configuration to each other such that when the criterion of the linked reporting configuration is satisfied, the wireless terminal sends the measurement report related to the linked measurement object, and an objects prioritization indicating that the wireless terminal is to perform measurements in accordance with the measurement objects in order starting with the measurement object with a highest object priority, wherein the measurement unit is structured to, for each measurement object in order starting with the measurement object with the highest object priority, measure the frequency layer of that measurement object, and to determine whether that measurement satisfies the criterion of any of the reporting configurations linked to that measurement object, and wherein the communication unit is structured to report to the node information related to that measurement for each reporting configuration linked to that measurement object and whose criterion is satisfied by that measurement.

34. The wireless terminal of claim 31,
wherein the measurement configuration comprises:
one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, one or more measurement identities, each measurement identity linking a measurement object and a reporting configuration to each other such that when the criterion of the linked reporting configuration is satisfied, the wireless terminal sends the measurement report related to the linked measurement object, and a reporting prioritization indicating that the wireless terminal is to perform measurements in accordance with the measurement objects in order starting with the measurement object linked to the reporting configuration with a highest reporting priority, wherein the measurement unit is structured to, for each reporting configuration in order starting with the reporting configuration with the highest reporting priority, measure the frequency layer of each measurement object linked to that reporting configuration, and to determine whether that measurement satisfies the criterion of that reporting configuration, and wherein the communication unit is structured to report to the node information related to that measurement when that measurement satisfies the criterion of that reporting configuration.

35. The wireless terminal of claim 34, wherein the measurement unit is structured to, for each measurement made in accordance with the measurement object linked to that reporting configuration, determine whether that measurement satisfies the criterion of any of the reporting configurations, wherein the communication unit is structured to, for each measurement made in accordance with the measurement object linked to that reporting configuration, report to the node information related to that measurement for each reporting configuration whose criterion is satisfied by that measurement, and wherein among the reporting configurations whose reporting criterion is satisfied by that measurement, the reports are made in order of reporting priorities of the reporting configurations.

36. The wireless terminal of claim 31, further comprising a configuration update unit structured to update any one or more of measurement objects, reporting configurations, and measurement identities stored in a storage unit based on the received measurement configuration such that the measurement configuration prioritization indicated in the measurement configuration is reflected in the updated measurement objects, reporting configurations, and measurement identities.

37. The wireless terminal of claim 31, wherein the measurement configuration comprises:
one or more measurement objects, each measurement object indicating a frequency layer to be measured by the wireless terminal, and each frequency layer including one or more frequencies of a particular radio access technology, one or more reporting configurations, each reporting configuration indicating a criterion that triggers the wireless terminal to send a measurement report to the node, and one or more measurement identities, each measurement identity linking a measurement object and a reporting configuration to each other such that when the criterion of the linked reporting configuration is satisfied, the wireless terminal sends the measurement report related to the linked measurement object, wherein the measurement configuration further comprises at least two of an identities prioritization, an objects prioritization, and a reporting prioritization, in which the identities prioritization indicates that the wireless terminal is to perform measurements in accordance with the measurement objects in order starting with the measurement object linked to the measurement identity with a highest identity priority, the objects prioritization indicates that the wireless terminal is to perform measurements in accordance with the measurement objects in order starting with the measurement object with a highest object priority, and the reporting prioritization indicates that the wireless terminal is to perform measurements in accordance with the measurement objects in order starting with the measurement object linked to the reporting configuration with a highest reporting priority, and wherein the measurement configuration prioritization includes nested levels of prioritization among the at least two of the identities prioritization, the objects prioritization, and the reporting prioritization.

38. The wireless terminal of claim 31, wherein the measurement configuration commands the wireless terminal to performs the measurements.

* * * * *

UNITED STATES PATENT AND TRADEMARK OFFICE
CERTIFICATE OF CORRECTION

PATENT NO. : 9,020,488 B2  Page 1 of 1
APPLICATION NO. : 13/204067
DATED : April 28, 2015
INVENTOR(S) : Axell et al.

It is certified that error appears in the above-identified patent and that said Letters Patent is hereby corrected as shown below:

In the Specification

In Column 3, Line 8, delete "measurements; and" and insert -- measurements; --, therefor.

In Column 4, Line 47, delete "coverage area 120," and insert -- coverage area 122-1, --, therefor.

In Column 10, Line 26, delete "ID 1" and insert -- ID1 --, therefor.

Signed and Sealed this
Thirteenth Day of October, 2015

Michelle K. Lee
*Director of the United States Patent and Trademark Office*